(12) United States Patent
Knaz

(10) Patent No.: US 8,428,234 B2
(45) Date of Patent: *Apr. 23, 2013

(54) METHOD AND SYSTEM FOR MANAGING CONFERENCING RESOURCES IN A PREMISES

(75) Inventor: Eran Knaz, Qadima (IL)

(73) Assignee: Polycom, Inc., San Jose, CA (US)

( * ) Notice: Subject to any disclaimer, the term of this patent is extended or adjusted under 35 U.S.C. 154(b) by 953 days.

This patent is subject to a terminal disclaimer.

(21) Appl. No.: 12/465,566

(22) Filed: May 13, 2009

(65) Prior Publication Data

US 2009/0285130 A1    Nov. 19, 2009

Related U.S. Application Data

(60) Provisional application No. 61/127,525, filed on May 14, 2008.

(51) Int. Cl.
*H04M 3/42* (2006.01)
(52) U.S. Cl.
USPC ............ 379/201.01; 379/211.02; 379/221.14; 455/417
(58) Field of Classification Search ............. 379/201.01, 379/211.02, 221.14; 455/417
See application file for complete search history.

(56) References Cited

U.S. PATENT DOCUMENTS

| | | | | | |
|---|---|---|---|---|---|
| 5,428,663 | A | * | 6/1995 | Grimes et al. | 340/7.21 |
| 5,822,418 | A | * | 10/1998 | Yacenda et al. | 379/201.07 |
| 5,872,841 | A | * | 2/1999 | King et al. | 379/210.01 |
| 6,647,107 | B1 | * | 11/2003 | Horrer | 379/214.01 |
| 7,443,972 | B1 | * | 10/2008 | Barlow et al. | 379/212.01 |
| 2004/0085914 | A1 | * | 5/2004 | Baxley et al. | 370/260 |
| 2005/0136845 | A1 | * | 6/2005 | Masuoka et al. | 455/67.14 |
| 2006/0223511 | A1 | * | 10/2006 | Hagale et al. | 455/417 |
| 2008/0004002 | A1 | * | 1/2008 | Chin et al. | 455/425 |
| 2008/0056475 | A1 | * | 3/2008 | Brannick et al. | 379/201.01 |
| 2010/0240343 | A1 | * | 9/2010 | Russell | 455/411 |

* cited by examiner

*Primary Examiner* — Quynh Nguyen
(74) *Attorney, Agent, or Firm* — Wong, Cabello, Lutsch, Rutherford & Brucculeri, LLP

(57) ABSTRACT

A conferencing system for an enterprise is disclosed. The conferencing system includes a management apparatus for managing conferencing resources in a premises. The management apparatus includes a communications link for communicating with a proximity announcing system, which indicates whether a portable communications device is near a conferencing device within the premises. The management apparatus can transmit a message to a proximate portable communication device indicating that a conferencing device is nearby. The proximity announcing system can include wireless transmitters and receivers associated with the premises and with portable communication devices used within the premises for tracking the location of the portable communication devices throughout the premises.

22 Claims, 7 Drawing Sheets

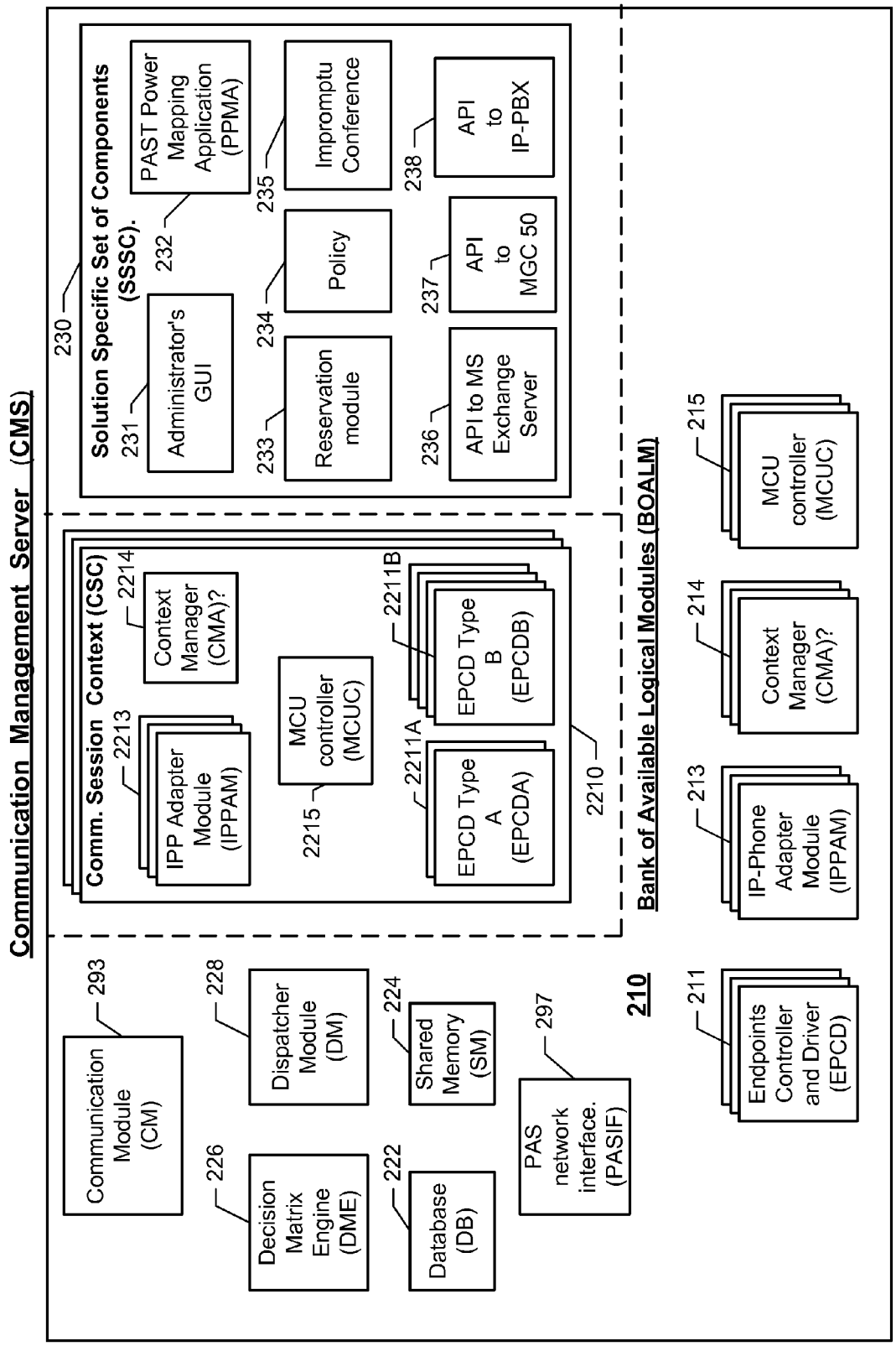

METHOD AND SYSTEM FOR MANAGING CONFERENCING RESOURCES IN A PREMISES

RELATED APPLICATION DATA

This Application claims priority to Provisional U.S. Patent Application Ser. No. 61/127,525 filed 14 May 2008 titled "Method And System For Adapting Control Panel Of A Mobile Terminal Into Control Panel Of An Organizational Conferencing Terminal" by Eran KNAZ, which is hereby incorporated by reference in its entirety. This application is related to application Ser. No. 12/465,548 entitled "Method And System For Transferring A Conference Between A Mobile Communication Device And A Conferencing Terminal" by Eran KNAZ, application Ser. No. 12/465/558 entitled "Method And System For Initiating A Conference Based On The Proximity Of A Portable Communication Device" by Eran KNAZ, application Ser. No. 12/465,574 entitled "Method And System For Providing A User Interface To A Portable Communication Device For Controlling A Conferencing Session" by Eran KNAZ, filed concurrently herewith, each of which is hereby incorporated by reference in its entirety.

FIELD OF THE INVENTION

The subject matter of the present disclosure relates to the field of videoconferencing, and more specifically to controlling and routing conferencing sessions between terminals of an organization.

BACKGROUND

Multimedia conferencing is becoming more and more popular in day to day operation of corporations. An organization can have a plurality of conferencing terminals and/or virtual meeting rooms. The conferencing terminals may be of different types or models or from different vendors and may have its own type of control panel. The diversity of different types of equipment, each using different types of control panels can make learning and using video conferencing equipment challenging A multimedia terminal or a meeting room typically has a unique address (dial in number), which is different than the direct phone number of an employee of an organization, thus creating another obstacle for establishing a multimedia session. Additional information regarding virtual meeting rooms can be found in co-owned U.S. patent application Ser. No. 10/960,337, the entire contents of which are incorporated herein by reference.

Furthermore, there are occasions when a user would like to change the type (media) of a current communication session while keeping the continuity of the session. For example, an employee may want to move from one room to another, or to convert an audio point-to-point (P2P) call presently proceeding via his phone extension into a conference session executed in a meeting room or vice-versa. Depending on the dynamics of the communication session a user will appreciate the freedom to change media, connection type, endpoint, etc. Presently, such a change is complicated and requires terminating the existing session and setting up a new session on another terminal (endpoint), which may have an unfamiliar control panel and also requires initiating a new dialing process with a new dial in number, etc.

Therefore it would be advantageous to have a single address (dial-in number) per a member or employee of an organization. For example, a phone number of the employee's personal extension phone can be used as a single dial-in number that can be used for different types (media) of communication sessions. An exemplary personal phone can be a wireless extension IP phone, a cellular phone, etc. It would also be advantageous if the personal phone were adapted to identify the existences and the availability of conferencing resources or facilitate transferring the call from the user's personal phone to a conferencing terminal (endpoint).

In addition, there is a need for a universal control panel for controlling a plurality of types of multimedia terminals. There is also a need to facilitate changing the mode of a communication session, for example, changing from a P2P communication session to a conference, changing from an audio conference to video conference, etc. Such improvements can increase the willingness of users to use and enjoy the benefits of multimedia sessions. It can be appreciated that such improvements would contribute to the experience and productivity of the employees of an organization.

SUMMARY

The present disclosure provides methods and systems for providing the above-described needs by providing a personal communication device such as a mobile communication device having a single dial-in number that can be used for participating in point-to-point (P2P) audio sessions as well as multimedia conferencing sessions, thereby providing the advantage of one dial in number per employee, regardless of the type of communication. The personal communication device can be a wireless phone IP extension phone, a cellular phone, a common phone, a WiMAX device, a laptop with audio (with or without video communication capabilities), a personal digital assistance (PDA/smart phone) with audio (with or without video communication capabilities), etc. The exemplary system can transfer a call from the personal communication device to a multimedia conferencing terminal and vice versa. In addition the control panel of the personal communication device can be used to control the multimedia conferencing terminal.

An exemplary embodiment can include a proximity announcing system (PAS) for identifying the existence and availability of nearby conferencing resources. An exemplary proximity announcing system may include a wireless beacon associated or embedded within a multimedia endpoint. The wireless beacon can periodically transmit information about the associated multimedia endpoint. The information can include the type of the endpoint, its address (dial in number), etc. Alternatively, such information about the associated endpoint can be stored at a database. In such embodiment, the content of the beacon can be an internal (organizational) ID number of the endpoint. The internal ID number can be used as an index or identifier for locating a record in the database that includes additional information regarding the associated endpoint. An exemplary personal communication device can be capable of receiving the beacon's signal, processing the announcement and informing the user about the existence of the multimedia endpoint. In response, an instruction can be sent, using the control panel of the personal communication device, toward a communication management server.

Alternatively, the wireless beacon can be associated with the personal communication device and the receiver for receiving the wireless beacon can be associated with the multimedia endpoint (terminal). In such an embodiment, the endpoint may inform the communication management server that a communication handled by a certain personal communication device is being conducted in the proximity of the endpoint. In response, the communication management server may transmit an informing message (announcement) to the personal communication device informing the user of the option of transferring the present communication session to the nearby endpoint, thus leading him to transfer the session to the endpoint. In one embodiment, the call can be transferred and controlled using the control panel of the personal communication device. Alternatively, if the multimedia endpoint includes the receiver of the beacon signal, the communication management server may send an announcing message to be displayed on the control panel of the personal communication device and not on the multimedia endpoint. Still alternatively, the announcing message can be displayed on both terminals the one of the personal communication device and on the monitor of the multimedia endpoint.

In an alternative embodiment, a location announcing beacon can be associated with a room having a multimedia endpoint and the location announcing beacon can transmit a signal that identifies the room. The personal communication device can be adapted to receive and process the beacon signal and retrieve the room ID. Accordingly, the personal communication device can transfer its location to the communication management server and the communication management server can identify which multimedia endpoints exist in the room or near the room. The communication management server can designate a multimedia endpoint as an associated multimedia endpoint and may prompt the user, via the control panel of the personal communication device, to transfer the call to the associated endpoint. Other location identifier methods can be implemented; such as, but not limited to, a GPS unit, processing received signals from one or more WiMax base stations, etc.

The communication management server can instruct the associated endpoint or the personal communication device to set up a multimedia P2P communication session, or in case of multipoint conferencing a multipoint control unit (MCU) can be instructed to establish a communication session with the associated multimedia endpoint and the one or more other users that are currently communicating with the employee via his personal communication device. After establishing the multimedia session the communication management server can load a universal multimedia control panel to the personal communication device, converting the control panel (e.g., user interface capabilities like a touch screen) of the personal communication device into a control panel for the associated multimedia endpoint. The communication management server can serve as an intermediate controlling node. The server may receive commands from the personal communication device, convert the command to commands that can be executed by the multimedia endpoint and can send the converted command toward the multimedia endpoint.

The communication management server can instruct the endpoint to display a universal multimedia control panel having a menu and a cursor allowing the user to move the cursor along the menu to an appropriate line or icon. The cursor can be controlled using the control panel of the personal communication device via the communication management server. Several control schemes of the soft key can be used, depending on the media that is served by the terminal. For example, one type of control scheme can be used for audio sessions, another control scheme can be used for videoconferencing sessions, another for controlling an MCU, etc. The audio scheme can include mute, volume, hold, etc. The video scheme may additionally include camera control, layout selection etc. The same audio and/or video control scheme can be used independently of the module/vendor of the audio and/or the multimedia terminal that is currently controlled.

The communication management server can be adapted to translate the commands according to the requirements of the endpoint and to transfer the commands to the endpoint.

After transferring the sessions to the multimedia endpoint, the user can have options to transfer the session back to his personal communication device and move to another room, where the session can be transfer to another multimedia endpoint.

Controlling different types of multimedia endpoints through a user's personal communication device and using a universal GUI and a common scheme per media will improve the user experience and increase the utilization of the conferencing system. Since the personal communication device is a personalized device, it can be configured to include the user's personal data (contacts, meetings etc.) and also may access the organization database for contact data (buddy-list) or any other personal data. A generic control panel can be adapted to the control panel of the personal communication device and can be displayed over the control panel of the personal communication device.

An exemplary communication management server can be a middleware server that is connected to other communicational controllers. It can be connected to a private IP-phone switching box (IP-PBX), to one or more MCUs, management servers (such as MS server, for example), and one or more multimedia endpoints; etc. The middleware server can be capable of routing calls to and from multimedia endpoints and IP phones via controlling the organizational MCUs, IP-PBX and the plurality of multimedia endpoints. In addition it can add or remove one or more participants to or from a currently conducted session.

These and other aspects of the disclosure will be apparent in view of the attached FIGs. and detailed description. In the disclosure the terms view and layout may be used interchangeably.

BRIEF DESCRIPTION OF THE DRAWINGS

Exemplary embodiments of the present invention will be more readily understood from reading the following description and by reference to the accompanying drawings, in which:

FIG. 2a is a simplified block diagram of an exemplary communication management server (CMS) that is implemented by a middleware server (MWS) while conducting conferencing sessions;

DETAILED DESCRIPTION

Turning now to the figures in which like numerals represent like elements throughout the several views, exemplary embodiments, aspects and features of the present disclosure are described. The purpose of the drawings is to describe exemplary embodiments and not for production or limitation. Therefore, features shown in the figures are chosen for convenience and clarity of presentation only. Time diagrams shown in the figures are chosen for convenience and clarity of presentation and are not necessarily shown to scale.

An endpoint may provide speech only, speech and video, or speech, data and video communications. Exemplary endpoints include Polycom VSX 7000, HDX 9004, conference phone VTX 1000, etc., by Polycom, Inc. As used herein, the term multimedia endpoint refers to an endpoint on a network capable of providing real-time, two-way audio/video communications and may also provide data communication with other endpoints or with a multipoint control unit (MCU). An MCU is a conference controlling entity located at a node of a network or in a terminal, which receives and processes multiple media channels from access ports according to certain criteria and distributes them to the connected channels. Examples of MCUs include the RMX 2000, MGC-100 (Polycom Inc.). Other MCUs can be embedded within a multimedia endpoint. Some MCUs are composed from two logical units a media controller (MC) and a media processor (MP). A more thorough definition of an endpoint (terminal) and an MCU can be found in the International Telecommunication Union ("ITU") standards, such as but not limited to the H.320, H.324, H.323, and Session Initiation Protocol (SIP). Additional information regarding the ITU standards can be found at the ITU website www.itu.int information regarding SIP can be found in www.ietf.org.

Figure 1A:
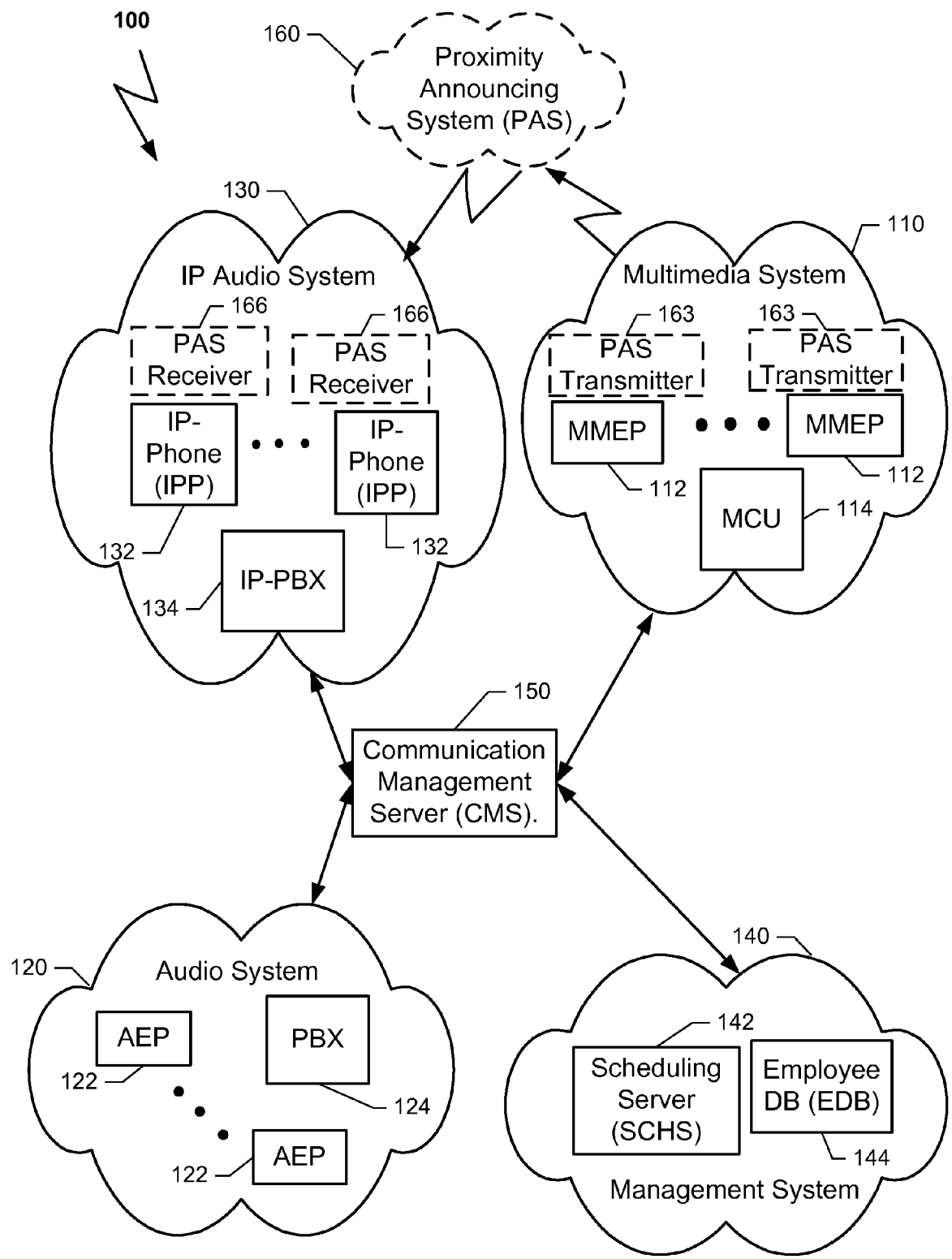
FIG. 1a illustrates an organization premises having a variety of electronic communication systems.

FIG. 1a is a block diagram illustrating an organization premises 100 having a multimedia system 110, an internet protocol (IP) audio system 130, a circuit switch audio system 120, a management system 140 a proximity announcing system (PAS) 160 and a communication management server (CMS) 150. In the example of premises 100, CMS 150 is implemented by a middleware server (MWS) that interfaces between those systems. Within each system cloud 110, 120, 130 and 140, elements of the system can communicate via a local network that can be a packet-switched network and/or circuit switched network. Those skilled in the art will appreciate that the number of systems, elements within a system as well as the CMS 150 shown in FIG. 1 are only exemplary and not limiting. It will be appreciated that the term organization premises is not limited to a physical location or structure. Exemplary audio system 120 can run over a circuit switch network such PSTN and among other elements may include a plurality of audio endpoints (AEP) 122. Exemplary AEP 122 can be POTS (plain old telephone service) telephones, conference room telephone such as VTX1000™ (Polycom Inc) etc. In addition, audio system 120 can include a private switching box PBX 124. PBX 124 can be a private switching box for routing calls between the different AEP 122, for audio conferences, and as interface between AEP 122 and the world outside of cloud 120.

IP audio system 130 can run over an IP network and may include a plurality of IP audio endpoints (IPAEP) 132. Exemplary IPAEP 132 can be IP Phones (IPP) such as but not limited to Sound Point IP 4000™ (Polycom); personal computers (PC), laptop computers, etc. capable of enabling audio sessions over an IP networks, etc. Some of the IPP can be wireless phones which can be used as personal communication device of an employee. Such a personal communication device can be associated with a proximity receiver 166, which is disclosed later on. In addition cloud 130 can comprise an IP-PBX 134. IP-PBX 134 can be used as a private switching box for routing calls between the different IPAEP 132, for audio conferences, and as an interface between the IPAEP 132 and the world outside cloud 130.

Multimedia system 110 can include one or more multipoint control units (MCU) 114 and a plurality of multimedia endpoints (MMEP) 112. Some of the MMEP 112 can run over an IP network, some over a circuit switch network, and some over both networks. Some of the MMEP 112 can also be used as an IPAEP 132 and vice versa. Some of the MMEP 112 can be used as an AEP 122 and vice versa. MCU 114 can be used for conducting multipoint audio and/or video and/or multimedia sessions between the different MMEP 112 and between some of the AEP 122 and/or some of the IPAEP 132. Point to point (PTP) multimedia session can be handled directly by the MMEP 112 or via MCU 114 if transcoding is needed. Transcoding is needed if the two endpoints are running over networks that use different communication protocols or the endpoints are using different compression standards, different bite rate, etc. In such cases MCU 114 serves as a gateway for converting protocols and/or compression standards or as interfaces between different networks, etc. Some of the MMEP 112 can be associated with a proximity announcing transmitter (a beacon) 163, which is discussed in more detail below. Embodiments of the disclosure are described as transferring a communication session from a personal communication device to a MMEP, but it should be realized that a communication session can be transferred from a personal communication device to any conferencing device, such as an audio conferencing endpoint, using the methods described herein.

Management system 140 is used for common operation of the organization and may include a scheduling server (SCHS) 142 such as MICROSOFT EXCHANGE SERVER™ (Microsoft) and an employee database (EDB) 144 that can include information on the employees of the organization including information such as names, employee's ID number, list of security permissions, email address, telephone numbers, IP address, buddy list, etc. Management system 140 may include other servers that are not shown, for example email servers, organizational web sites, etc.

Exemplary proximity announcing system 160 (PAS) can be a wireless system that is installed in the organization premises 100 to identify situations in which a personal communication device is in proximity with a multimedia endpoint. An exemplary PAS 160 can be based radio frequency (RF) technology using common protocol such as Bluetooth or a proprietary protocol. An alternate exemplary embodiment can be based on infra red technology (IR), or any other wireless technologies. PAS 160 can be unidirectional, having a plurality of PAS transmitters (PAST) 163 and a plurality of PAS receivers (PASR) 166. Alternatively, (not shown in the drawings) PAS 160 can be bidirectional, system having a plurality of proximity transmitters/receivers. Other exemplary PAS 160 can be based on commercial methods that are capable of identifying location and/or proximity. Exemplary PAS 160 can be based on GPS receivers, cellular phones, WiMAX, etc.

Exemplary disclosed embodiments can be implemented in various configurations. For example, in PAS 160 illustrated in FIG. 1 each PAST 163 is associated with a MMEP 112 and each PASR 166 is associated with a personal communication device 132. An exemplary PAST 163 can transmit a unique signal (beacon) that identifies its associated MMEP 112. The unique signal can point to an identification number (ID) of the associated MMEP 112. The ID can be an organizational unique number, a MAC address, an IP address, etc. Each PAST 163 can be calibrated in such a way that the power of its transmitted signal is limited and/or directed to a certain space.

An exemplary PAST 163 can be adapted to transmit its beacon only when its associated MMEP 112 is capable of participating in a communication session. Exemplary PAST 163 can sit on top of its associated MMEP 112, for example. Alternatively, an exemplary PAST 163 can be embedded within its associated MMEP 112 as one of the components of the MMEP. Alternatively, PAST 163 can be associated with a visual indication of its ID and/or a visual indication that is currently communicating with a PASR 166 via CMS 150 or directly, when PAS 160 is bidirectional. Yet in another exemplary embodiment a sign can be place in association with a MMEP 112 indicating an ID of the MMEP. In such embodiment, a user can use his personal communication device control panel to transfer the call from the personal device to the MMEP according to its ID number. After transferring the call the user can control the multimedia session via the control panel of his personal communication device.

An exemplary PASR 166 can be associated with a personal communication device 132. It can be attached or embedded within the associated personal communication device 132. An exemplary PASR 166 can be capable of receiving beacons that are transmitted by the plurality PAST 163, processing the received signals, and identifying the ID number that is carried by the strongest beacon, i.e., the one that its received signal has the highest power. Alternatively, PASR 166 can send a list of received beacons to CMS 150 and allow the server to select an appropriate MMEP. Each entry in the list may include indication about the power of the received signal and its associated ID number. PASR 166 can be capable of communicating the received ID number to the CMS 150. The connection with CMS 150 can be established directly by PASR 166 or via its associated personal communication device 132. Upon receiving the information from PASR 166 CMS 150 can inform the user of the relevant pair (PASR 166 and its associated personal communication device 132) about the option to transfer the call. The information can include a list of optional MMEP 112, a selected MMEP 112, etc. Informing the user can be execute via the user's personal communication device 132.

Other exemplary PAS (not shown in the drawing) may use other configurations. For example, an exemplary PAS can use room identifiers instead of MMEP identifiers. In such an embodiment each PAST can be associated with a room and an exemplary CMS can have a cross index table. Each entry in the cross index table can be associated with a room ID and information about one or more MMEPs that exist in the room. An exemplary commercial room identifier transmitter can be a Bluetooth beacon device.

In an alternative exemplary configuration of a PAS, the PASRs can be associated with an MMEP or a room and PASTs can be associated with the personal communication devices. In such exemplary configuration the PASR can be adapted to communicate with the CMS directly or via its associated MMEP and inform the CMS that a certain personal communication device is in proximity with a certain MMEP or that the certain personal communication device has entered to the room. The CMS, based on its cross index table, can inform the user about the option to transfer the call to an appropriate MMEP. The message can be sent to the personal communication device to be displayed on its control panel. Alternatively or additionally a visual message can be displayed on the appropriate MMEP.

In yet another alternate configuration, a PAST can be an employee RFID card and a PASR, which can be associated with a room or a MMEP, can be adapted to receive and process the employee RFID signal. The notification that the employee is in proximately with a certain MMEP or in a certain room can be sent to the CMS. The CMS can consult with IP-PBX 134 to determine whether the employee's personal communication device is currently active. If so, the CMS can inform the employee that the call can be transferred to a nearby MMEP.

In another exemplary configuration in which the IP audio system 130 is used as the personal communication network, the IP audio system can be adapted to process received RF signature (a keep alive signal) of each personal communication device near different base stations (access points) in the organization. A controller of the wireless network can be adapted to process information related to the received RF signature from one or more RF base stations and compare current information to previously received information to determine a course of movement by the personal communication device. The information can be RF power and/or direction, for example. After processing the data a decision can be made regarding an expected location of the personal communication device. The location information can be sent to the CMS. Alternatively, the CMS may receive the raw data about the RF signatures and may process the data by itself. In such a configuration special modules for PAST and PASR are not needed because the IP-audio system is adapted to execute the tasks of the PAS. The operation of PAS 160 and PAST 163 and PASR 166 is further discussed below.

Communication management server (CMS) 150 can be installed in the organizational premises 100 and can communicate with the one or more MCU 114, IP-PBX 134, PBX 124, SCHS 142, EDB 144. In other embodiments, CMS 150 additionally can communicate directly with some of the IPAEP 132, MMEP 112, and AEP 122. PASR 166 can communicate with CMS 150 directly or indirectly via an associated personal communication device 132 or an associated MMEP 112. The communication between CMS 150 and the different elements of premises 100 can be conducted over an IP network or any other data communication network that is used over the organizational premises 100. In the present description an IP network is used as an exemplary network for the communication between CMS 150 and the other elements of premises.

In one embodiment, CMS 150 can be implemented as an independent server. In other embodiments CMS 150 can be embedded within a network device of the organizational premises 100 such as, but not limited to, MCU 110, IP-PBX 130 or PBX 124. CMS 150 can be adapted to interface between the different communication systems (110, 120 and 130) and PAS 160. According to the requirements of the organization CMS 150 can be adapted to establish and manage multipoint multimedia conferencing sessions over the one or more communicational networks 110, 120 and 130 and/or transfer calls from one network to another. CMS 150 can upgrade a call from an audio to multimedia over an associated MMEP 112 and provide a single dial-in number per employee. The single dial-in number can be the dial-in number of the employee's personal communication device 132. Furthermore, the CMS 150 can transfer the call from the personal communication device 132 to any MMEP 112 of the organization as well as controlling the multimedia session via the control panel of the personal communication device. CMS 150 is discussed in more detail below in conjunction with FIGS. 1*b*&*c*, 2, 3 and 4.

Figure 1B:
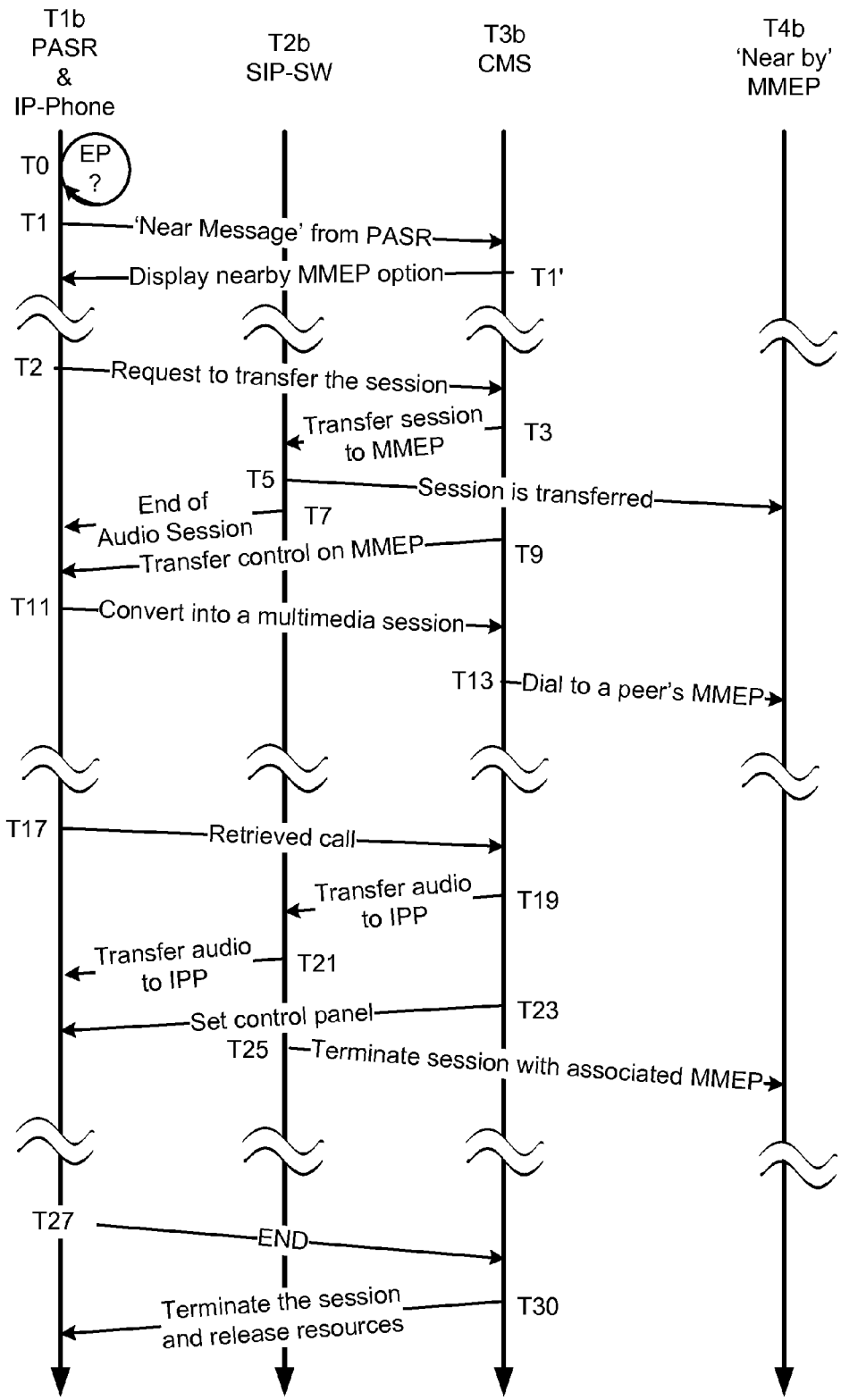
FIG. 1b is a simplified timing diagram illustrating exemplary processes handled by different nodes for controlling and transferring a P2P communication session from an IP phone to a multimedia endpoint.

FIG. 1*b* is a simplified timing diagram showing exemplary P2P communication session started over a personal communication device 132 (FIG. 1*a*). The figure illustrates the timing of an exemplary processes for controlling and converting the P2P audio session into a P2P multimedia session over a nearby MMEP 112 (FIG. 1*a*). The processes can be executed by different nodes along the communication line. Four time axes are illustrated: T1*b;* T2*b,* T3*b* & T4*b.* T1*b* is associated with the IP phone 132 and with its associated PASR 166 (FIG. 1*a*). T2*b* is associated with a (session initiation protocol) SIP switch (not shown in the drawings) installed in the organization premises 100 for switching SIP communication sessions to the appropriate destination. In some embodiments, the SIP switch (SIP-SW) can be a separated entity; in other embodiments it can be embedded within another network node such as but not limited to IP-PBX 134, MCU 114, etc. T3*b* is associated with CMS 150 (FIG. 1*a*) and T4*b* is associated with the nearby MMEP 112.

Initially at T0 the session is being conducted over the personal communication device 132 while its associated PASR 166 is waiting to receive a beacon signal from a nearby MMEP 112. Slightly before T1, one or more beacon signals are received by the associated PASR 166. At PASR 166 the beacon signals can be detected, analyzed and a decision is made about an ID number of the nearby MMEP 112. The decision can be based on the power of the received beacon signal, for example. In other embodiment, at the end of processing the received beacon signals a list of ID numbers and their associated power can be created. The results of the processing can be embedded into a 'nearby MMEP message'. The massage can comply with TCP/IP protocol for example. At T1 the message is transferred to CMS 150 over a direct connection that is set between PASR 166 and CMS 150, alternatively the message can be sent from PASR 166 to its associated personal communication device 132 and from there to CMS 150. For example, the message can be sent via the associated phone. The personal communication device 132 can be adapted to inform the user about the 'nearby MMEP 112' and let the user determine whether to send the 'nearby message' toward the CMS 150 or not.

On receiving the 'nearby message' CMS 150 may start processing the nearby message for identifying a nearby MMEP and determining whether the nearby MMEP 112 is available to handle the session. If the 'nearby message' includes a list of MMEP IDs and the power of their beacons, CMS 150 may process the list for determining which MMEP is the best nearby MMEP. Several methods can be used. An exemplary method can compare power and select the strongest one. Other methods may store few last 'nearby message' that were received from the same PASR. The current received data can be processed in view of the stored 'nearby message' to determine the course of movement of the user and accordingly select the appropriate MMEP. Still alternatively, PAS system 160 can be calibrated by mapping the MMEP 112 with the received signals of PASTs 163 in the organization 100. At the end of the calibration process a MMEP cross index table (MCIT) can be created and stored at CMS 150. Each entry in the MCIT can be associated with a MMEP 112 and the fields of each entry can reflect one or more combinations of power of the beacons of PAST that are received by a PASR when the PASR is near the relevant MMEP. In such an embodiment CMS 150 can be adapted to search the MCIT looking for a matching entry. The matching entry can include a combination of stored power of beacons that is similar to the receive list. The MMEP that is associated with the entry can be defined as the nearby MMEP.

After determining which MMEP is the nearby, CMS 150 can check whether the nearby MMEP is available to get the call. CMS 150 can check, with EDB 144 (FIG. 1), whether the user is authorized to use the nearby MMEP. Furthermore, CMS 150 can check with other servers such as SCHS 142 (FIG. 1*b*) whether the nearby MMEP is reserved for a session in the near future. CMS 150 can check also with the nearby MMEP whether it is busy or in standby, etc. If the nearby MMEP is available then at T1' a prompt, such as banner, can be sent to be displayed on the control panel of the personal communication device, prompting the user to transfer the session to the nearby MMEP 112. The banner can be used as a soft key, which can be selected by the user for requesting to transfer the session to the nearby MMEP 112. At T2, in response to the prompting the user can press the soft key and a request to transfer the session to the nearby MMEP is sent toward the CMS 150 (FIG. 1)

At T3, an instruction can be sent to the SIP-SW requesting it to switch the call to the nearby MMEP. In the example of FIG. 1*b* if the other side of the session is using an MMEP, then a negotiation session can be initiated between the nearby local MMEP and the remote MMEP. At the end of the negotiation session the session can be transferred at T5 from the personal communication device to the nearby MMEP and the current session is terminated at T7. At T9 CMS 150 can load a generic MMEP control panel into the control panel of the personal communication device 132 allowing the user to control the multimedia session via his personal communication device. If the far end is using an audio only device, the audio signal is transferred to the nearby MMEP and the nearby MMEP acts as an audio endpoint. The user at T11 may use the loaded generic control panel to instruct the CMS 150 to convert the call to a P2P multimedia session. The instruction can include the dialing number of a MMEP that is associated with the other participant. At T13 CMS 150 can set up a connection with the nearby MMEP and instruct it to dial to the peer's MMEP.

If the far end uses a personal communication device that is associated with a PASR 166, then the other side can transfer the call to a nearby MMEP that is identified by his personal communication device. In an alternate embodiment the CMS 150 or the nearby MMEP can sense that the call has been transferred from the personal communication device to the nearby MMEP. Upon sensing that the call has been transferred the CMS 150 can instruct the nearby MMEP to call a MMEP that is associated with the other party. Calling information of the other party's MMEP can be found in a database associated with the organization.

During the multimedia session the user may wish to move to another room and at T17, using the control panel of the user's personal communication device 132, an instruction is sent to CMS 150 asking to retrieve the call back to the personal communication device. CMS 150 at T19 sends an instruction to the SIP switch requesting to transfer the audio connection of the session from the nearby MMEP to the personal communication device and to terminate the video connection. At T21 a new negotiation session can be initiated between the personal communication device and the other MMEP of the far end. At the end of the negotiation session the audio connection of the session is transferred to the personal communication device 132. The video connection with the far end is terminated and at T25 the nearby MMEP is released. At T23 CMS 150 can replace the generic multimedia control panel of the personal communication device with a generic control panel of an audio session.

At T27 the session is terminated and an indication is sent to the CMS 150. In response, a common control panel of the personal communication device is loaded T30 to the personal communication device and the resources at the CMS 150 that were allocated to the session are released.

Figure 1C:
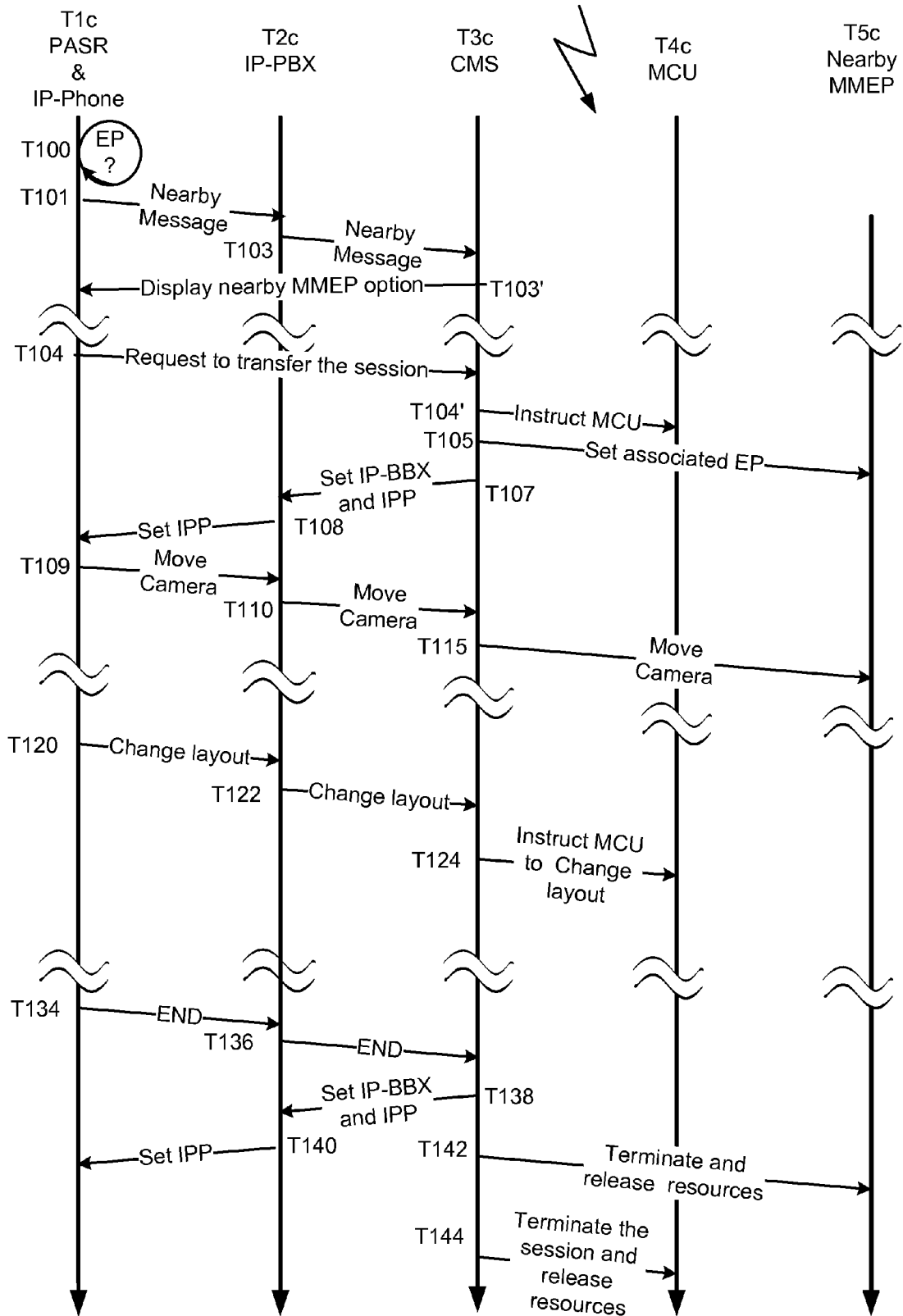
FIG. 1c is a simplified timing diagram illustrating exemplary processes handled by different nodes for controlling and transferring a multipoint conferencing session from an IP phone to a multimedia endpoint via an MCU.

FIG. 1*c* is a simplified timing diagram of an exemplary communication session initiated as a P2P audio session over a personal communication device 132 (FIG. 1*a*) and converted to a multipoint multimedia session (a multimedia conference) using a nearby MMEP 112 and MCU 114. The processes can be executed by different nodes along the communication line. Five time axes are illustrated: T1*c;* T2*c,* T3*c,* T4*c* & T5*c.* T1*c* is associated with the IP phone 132 and with its associated PASR 166 (FIG. 1*a*). T2*c* is associated with IP-PBX 134 (FIG. 1*a*). T3*c* is associated with CMS 150 (FIG. 1*a*). T4*c* is associated with MCU 114 (FIG. 1*a*) and T5*c* is associated with the nearby MMEP 112 (FIG. 1*a*).

Initially at T100, the session is conducted over the personal communication device 132 while its associated PASR 166 is waiting to receive a beacon signal from a nearby MMEP 112. Slightly before T101, one or more beacon signals are received by the associated PASR 166. Processing of the received one or more beacon signals can be similar to one of the methods described above in conjunction with the period of T0 and T1 in FIG. 1*b.* At the end of the process, a 'nearby message' is sent at T101 via the personal communication device to IP-PBX 134 and from there at T103 to the CMS 150. Alternatively, the message can be sent directly from the PASR 166 to the CMS 150. The message can include information about one or more nearby MMEP 112.

On receiving the 'nearby message' CMS 150 may start a process for converting the P2P audio session into a multimedia conference. The process can include a similar process as described above for determining which MMEP is the nearby MMEP. CMS 150 can check whether the nearby MMEP is available for the call. If the nearby MMEP is not available a denial message can be sent toward the personal communication device and displayed on its control panel. If the nearby MMEP is available, at T103' a banner can be sent to be displayed on the control panel of the personal communication device, prompting the user to transfer the session to the nearby MMEP 112. The banner can be used as a soft key, which can be selected by the user for requesting to transfer the session to the nearby MMEP 112. At T104 the soft key is selected requesting to transfer the session to the nearby MMEP, then information regarding the MMEPs of the far end participants is collected. Information regarding the far end participants can be entered by the user as part of the nearby message or as an associated message that follows the nearby message alternatively the information can be sent in response to a question from CMS 150. The information regarding the conference can include a dial in number for dialing to the MCU 114 for an ongoing conference; or a list of dial in numbers of the other participants or names of participants that dialing information to their MMEP exist in EDB 144 (FIG. 1*a*), for example.

After collecting the information regarding the far end participant(s), an instruction can be sent T104' to MCU 114 requesting it to set a multimedia conference based on the collected information. At T105 an instruction can be sent to the nearby MMEP instructing it to call the MCU using the dial in number. Alternatively the MCU can be instructed to dial out to the nearby MMEP 112 to add it to the conference. At T107 CMS 150 can send a generic MMEP control panel to IP-PBX 134 and from there, at T108, the generic multimedia control panel is loaded into the control panel of the personal communication device 132. The generic multimedia control panel allows the user to control the multimedia conference via his personal communication device. The user at T109 may use the generic control panel and send a request to move the camera toward IP-PBX and from there at T110 the command is sent to CMS 150. CMS 150 can convert the generic command into a move camera command that matches the requirements of the nearby MMEP 112 and the appropriate command is sent at T115 toward the nearby MMEP.

At T120 the user may wish to change layout from a current layout of 2×2 to a switching layout, for example. As known in the art, a 2×2 layout is a layout in which video images of four participants is displayed and a switching layout is a layout in which the image of the current speaker is displayed over the screen of the MMEP. The generic command of selecting a switching layout is selected via the control of the personal communication device. The generic instruction is transferred T120 to IP-PBX and from there at T122 the generic command is transferred to CMS 150. CMS 150 can convert the generic command to match the relevant MCU 114 and the converted appropriate command is sent at T124 toward the MCU 114.

At T134 the session is terminated and an indication is sent to IP-PBX 134. The termination command is transferred T136 to CMS 150. CMS 150 can send T138 & T140 the common control panel to the personal communication device 132 via IP-PBX. An end of session command with release of resources can be sent at T124 & T144 toward the nearby MMEP 112 and the MCU 114 (respectively) and resources of the CMS 150, which were allocated to the session, are released. Alternatively, if personal communication devices 132 and CMS 150 can communicate directly with each other the intermediate stapes in which IP-PBX is involved for transferring data between the personal communication devices and the CMS can be skipped.

There are occasions in which point-to-point multimedia session that was established according to the time diagram of FIG. 1*b,* for example, can be upgraded to a multipoint session when a third party is calling one of the two participants of the point-to-point session, that has an exemplary personal communication device with a PASR 166. An exemplary time diagram for such a process can be similar to FIG. 1*c* with few modifications that illustrates the upgrading from point-to-point session into multimedia session by involving an MCU, for example.

FIG. 2*a* is a block diagram of an exemplary CMS 200, which is implemented as a middleware server. FIG. 2*a* illustrates the modular nature of the CMS 200 with relevant functional modules needed for describing the operation of the PAS 160 (FIG. 1) with the different communicational and management systems for establishing and controlling one or more multimedia conferences. An exemplary CMS 200 can be divided into three sections: a basic set of components 210, a solution specific set of components (SSSC) 230, and ongoing-communication-session-contexts (CSC) 2210. An exemplary CSC 2210 can be allocated per each communication session that involves a PAS transaction and/or a multimedia session. CSC 2210 can be composed from a combination of logical modules that are included in a bank of available logical modules (BOALM) and are required for conducting the communication session. SSSC 230 can include a set of logical modules that are configured according to the needs of the organization in which CMS 200 is installed.

An exemplary basic set of components 210 can include a bank of available logical modules (BOALM), database (DB) 222, shared memory (SM) 224, decision matrix engine (DME) 226, dispatcher module (DM) 228, a communication module (CM) 293, and a PAS network interface module (PASIF) 297. CMS 200 can include other modules that are not shown in FIG. 2*a,* for example web services modules, etc. The BOALM can include several groups of logical modules 211 to 215, each group including a plurality of logical modules having the same functionality, but adapted to different types of equipment. As used herein, a logical module can be a physical entity or a logical entity that is composed from physical entities allocated to the logical module by the DM 228 when the logical module is needed in a context 2210 associated with a new conference. A logical module may be software, including a computer program, routine, or code, for example. Although three logical modules in a group are illustrated in BOALM, the present disclosure is not limited to a particular number and the presented configuration is intended to be illustrative of an exemplary configuration.

An exemplary BOALM includes a group of endpoint controller and drivers (EPCD) 211, a group of personal communication device (IP-Phone, for example) adapter modules (IPPAM) 213, a group of context manager applications (CMA) 214, and a group of MCU controllers (MCUC) 215. Other logical modules not illustrated can include a group of SIP components (SIPC) and/or a group of H.323 gatekeeper modules, etc.

An exemplary dispatcher module (DM) 228 can act as a managing module of the CMS 200 and controls the operation of the entire CMS 200. DM 228 may get requests for initiating or terminating a communication session and accordingly may allocate resources for a context that will be associated with the communication session or release resources of a context that is associated with a terminating session. The request can be received from a scheduling server 142 (FIG. 1a) via its API 236, from one of the PASR 166 (FIG. 1a) via PASIF 297, MCU 114 via the MCU API 237, etc. Based on the request, DM 228 can allocate resources from BOALM 210 according to the request, create a context with those resources, and associate the appropriate logical modules with relevant locations in the site DB. For example, the location of information on a certain MMEP in the site section of DB 222 is transferred to the relevant EPCD 211. DM 228 may use the services of DME 226 to determine the best configuration of the context. DM 228 is described in more detail below, following an overview of the other modular components of the CMS 200. After establishing and initiating the context, DM 228 may receive status information on the operation of the context. Based on this information, DM 228 may consider replacing some of the logical modules with others or terminating the context or part of the context and releasing their resources back to BOALM 210 or to SM 224, etc.

The group of EPCD 211 can include driver applications for a plurality of types of endpoints. Exemplary endpoints include VSX8000™ and VSX7000™ (Polycom Inc.). For a given conference, one or more EPCDs 211 are selected or created by DM 228 and assigned to a context 2210 associated with that conference according to the type of endpoints that are to be connected in the conference. An exemplary EPCD 211 can be adapted to communicate with its associated endpoint via CM 293 and inform the user to dial a certain ISDN number or an IP alias of an MCU for joining the conference. Alternatively, the endpoint can be adapted to be controlled by the EPCD 211 and automatically dial to the MCU 114 (FIG. 1) to join a conference. Exemplary methods for instructing an endpoint to set a connection with an MCU are disclosed in U.S. patent application Ser. No. 10/941,790, the entire contents of which are incorporate herein by reference. If the associated endpoint cannot be instructed or informed to call an MCU, then EPCD 211 can send the dialing number of the endpoint to a queue assigned to the relevant MCUC 215. The MCUC 215 can retrieve the information from its queue and instruct the MCU to dial the endpoint. Such an endpoint can be a POTS telephone, for example.

In exemplary embodiments in which a PASR 166 (FIG. 1a) or PAST 163 are associated with a MMEP and are communicating via the MMEP an exemplary EPCD 211 can include controller and driver module for the associated PAST or PASR. The operation of an exemplary controller and driver module for a PASR is discussed more below in conjunction with IPPAM 213.

Upon initiation, each EPCD 211 can be introduced to locations in the shared memory SM 224 and/or DB 222 of the queues to/from which EPCD 211 can store or retrieve information, instructions, and or statuses relevant to its associated endpoint. In addition, EPCD 211 is informed of locations in the system section of the DB 222 (SSDB) from whence information on the type of the endpoint can be retrieved. Exemplary information can include bit rates, compression standards, etc. In addition, EPCD 211 can be informed of the location in the active sessions of the DB 222 (ASDB) from whence information on its current connected endpoint can be gathered. Exemplary information can be IP address of the relevant endpoint, ISDN number, bandwidth of the actual communication line, display size, etc.

During establishing a multimedia session an exemplary EPCD 211 can be assigned to a context that will be associated with a conference. The assigned EPCD 211 can be introduced by DM 228 to locations in the shared memory SM 224 and/or DB 222 of the queues to/from which EPCD 211 can store or retrieve information, instructions, and/or statuses relevant to the session. Exemplary queues can be the queues of the relevant EPCDs 211 and the relevant CMA 214 that are assigned to the same conference. An exemplary CMA 214 can be adapted to communicate with the endpoints that participate in the conference via the relevant EPCDs 211. The communication can include transferring of instructions that were received from the context manager application (CMA) 214 and targeted to one or more endpoints. Exemplary instructions can instruct certain endpoints to set a connection with a certain dial in number of an MCU, etc. The instruction can be placed in the queue that is associated with the relevant EPCD 211 by the CMA 214 associated with the conference. The CMA 214 distributes the command to the appropriate EPCDs 211 via their queues and waits for receiving status information on the success of setting the connection.

The group of IPPAM 213 can include driver applications for a plurality of types of personal communication devices such as IP-phones 132 (FIG. 1). Exemplary IP-phones 132 can include Sound Point IP 501, 302, etc. (Polycom Inc.). For a given conference, one or more IPPAM 213 are selected or created by DM 228 and assigned to a context 2210 associated with that conference. The one or more IPPAM 213 match the type of IP-phones 132 that will be connected to the conference. An exemplary IPPAM 213 can be adapted to communicate with its associated IP-phones 132 via CM 293. Alternatively or additionally IPPAM 213 can be adapted to communicate with its associated IP-phones 132 via IP-PBX 134 (FIG. 1a) using the API to the IP-PBX 238. The communication with the IP-Phone can prompt the user to dial a certain number or an IP alias of an MCU for joining the conference. Alternatively, the IP-phones 132 can be adapted to be controlled by the IPPAM 213 and automatically dial the conference number. If an associated IP-Phone cannot be controlled by IPPAM 213, then IPPAM 213 can send the address of the IP-Phone to a queue assigned to the relevant MCUC 215. The MCUC 215 can retrieve the information from its queue and instruct the MCU to dial the IP-Phone.

During a communication session an exemplary IPPAM 213 can have several tasks. One task can be associated with the media. Such a task can be used in a communication session in which the IP phone is used as a terminal of the communication session. During establishing a multimedia session an exemplary IPPAM 213 can be assigned to a context, which will be associated to a conference. The assigned IPPAM 213 can be introduced by DM 228 to locations in the shared memory SM 224 and/or DB 222 of the queues from which it can store or retrieve information, instructions, and/or statuses relevant to the session. Exemplary queues can be the queues of the relevant EPCDs 211, IPPAM 213 and CMA 214 that are assigned to the same conference. An exemplary CMA 214 can be adapted to communicate with the IP-phone that participates in the conference via the relevant IPPAM 213. The communication can include transferring of instructions that were received from the context manager application (CMA) 214 and targeted to the relevant IP-Phone. Exemplary instructions can include instructing a certain IP-phone to set a connection with a certain dial in number of an MCU. The instruction can be placed, by the relevant CMA 214, in the queue that is associated with the relevant IPPAM 213. The CMA 214 distributes the command to the appropriate IPPAM 213 via their queues and waits for receiving status information on the success of setting the connection.

Another task of IPPAM 213 to configure the control panel of its associated IP-Phone for controlling the communication session and enabling the user to convert the session into a multimedia session over a nearby MMEP. In addition, the user can control the operation of the nearby MMEP 112 (FIG. 1a) via the control panel of the personal communication device using a generic control panel for MMEP. Furthermore, the user by using the control panel can retrieve the session back to the IP-phone. The controlling task can be initiated upon receiving an indication from PAS 160 (FIG. 1a) via PASR 166 (FIG. 1a) and PASIF 297 that the PASR is nearby one or more MMEPs 112. The nearby message can be sent directly by PASR 166 over a connection that is established via CM 293 with PASIF 297. Alternatively the connection can be established via the IP-Phone 132 (FIG. 1a) that is associated with the relevant PASR. The IP-Phone can communicate directly with CM 293 and from there to PASIF 297. Alternatively, the IP-Phone can communicate with CM 293 via IP-PBX 134 (FIG. 1a) and API 238.

Upon receiving the nearby message PASIF 297 can parse the message, determine which IP-Phone is associated with the relevant PASR 166 and which MMEP 112 (FIG. 1a) is the nearby-MMEP. The decisions can be based on stored index tables in DB 222 or SM 224, for example. Each entry in the index table can be associated with an ID of a MMEP or personal communication device and it can include information about its type, dialing number and/or IP address, communication parameters such as bandwidth, compression standard etc. The index tables can be loaded during installation of the management system at a certain site, for example. Alternatively, the index tables can be updated when a new endpoint is added to the network. The new endpoint can be registered at CMS 200, for example. The information about the associated IP-Phone and the nearby MMEP can be transferred to DM 228.

In response DM 228 can initiate a context 2210 for the session, allocate an IPPAM 213 that matches the type of the associated IP-Phone and add it to the context. DM 228 can allocate an EPCD 211, which matches the type of the nearby MMEP and add it to the context. A CMA 214 can be allocated to the session for managing the operation of the allocated EPCD 211 and IPPAM 213. CMA 214 may prompt the user via IPPAM to convert the session into a multimedia session on the nearby MMEP, and to control the session via the control panel of the IP-phone. Prompting the user can be done by generating a generic nearby-menu for offering the user to use the nearby MMEP. The nearby-menu is transferred to the associated IPPAM that converts the generic nearby-menu according to the requirements of the IP phone and loads it via CM 293. The loading can be executed directly with the IP-Phone or via IP-PBX 134 (FIG. 1a). The user selections can be sent from the IP-phone to IPPAM 213, parsed by IPPAM 213 and transferred to CMA 214.

An exemplary PASIF 297 can use noise reduction methods and error reducing methods before determining that a nearby MMEP is really nearby. An exemplary PASIF 297 can be adapted to verify that a received nearby message repeats several times along a predefine period of time (few seconds up to few tens of seconds) before determining that the personal communication device is near a certain MMEP. In order to avoid jumping from one MMEP to another MMEP, an exemplary PASIF 297 can be capable of changing an already defined nearby MMEP (a first one) with another MMEP (a second one) only if the nearby message that points the second MMEP is received along a period that is twice longer than the period that was used for defining the first MMEP, for example.

There are occasions in which PASIF 297 may receive several different nearby messages from the same PASR 166 (FIG. 1) during the same monitoring period. It can happen when a user is in a room that has two or more endpoints, for example. The room can include a personal MMEP on a personal computer and a dedicated MMEP. One embodiment of PASIF 297 can transfer the ID of the two MMEP to the allocated IPPAM 213. The allocated IPPAM 213 can generate a nearby control panel according to the requirements of the personal communication device. The control panel includes the two options and lets the user to select his preferred MMEP as the nearby MMEP. In an alternate exemplary embodiment, PASIF 297 may consider with DME 226 for selecting automatically a preferred nearby MMEP. The preferred MMEP can be the dedicated MMEP since it can have higher resolution or a bigger screen than the personal MMEP, for example.

Some exemplary embodiments may use a power mapping method for mapping the rooms of the organization. An exemplary mapping procedure can be implemented after the installation of PAS 160. An administrator of the organization may measure the received power of one or more PAST 163 in several locations in each room that includes a MMEP. At the end of the process a mapping table is generated. Each entry in the map can be associated with a MMEP and include a combination of MMEPs and their power. The combination can be sorted from the stronger received signal to the weaker received signal. More information about the exemplary mapping method is provided below in conjunction with the description of the solution specific set of components 230.

In an embodiment that uses a mapping method, a nearby message can include an ID number of a MMEP and its received power. PASIF 297 can be capable of sorting the nearby messages that were received from the same PASR 166 during the same measuring period. The sorting can be done based on the received power. At the end, a combination of ID numbers sorted according to their power is created. The combination is compared to the mapping table and an entry is selected based on the combination. The entry can be used for defining the nearby MMEP.

An exemplary CMA 214 can be created by DM 228 and be assigned to a context to be associated with a communication session for managing the session and enables establishment of a conference or a multimedia session. Upon initiation each CMA 214 can be introduced to locations in the shared memory SM 224 and/or DB 222 of the queues to/from CMA 214 and can store or retrieved information, instructions and/or statuses that are relevant to its operation. Exemplary queues include queues of the relevant EPCD 211, the relevant MCUC 215, the relevant IPPAM 213 assigned to the same context, PASIF 297 and the DME 226. An exemplary CMA 214 can be adapted to perform several tasks that are associated with the session that include communicating with the user via generic control panels; transferring the session from a personal communication device to a nearby MMEP via its associated EPCD 211 or to an MCU via an MCUC 215. Furthermore, CMA 214 may get information on the required layout of the conference and transfer the layout information to the MCUC 215. More information on CMA 214 is provided below in conjunction with FIGS. 3 and 4.

MCUC 215 can be assigned to a context associated with a conference for managing the operation of an MCU that is associated with the same conference. MCUC 215 can be created by DM 228 and assigned to a context that will be associated to the conference. Upon initiation each MCUC 215 can be introduced to locations in the shared memory SM 224 and/or DB 222 of the queues to/from MCUC 215 and can store or retrieve information, instructions and/or statuses that are relevant to its operation. Exemplary queues can be queues of the relevant EPCD 211, the relevant IPPAM 2213 and the relevant CMA 214 that are assigned to the same conference. An exemplary MCUC 215 can be adapted to communicate with the MCU 114 (FIG. 1) via API 237. The communication can include transferring instructions received from the conference manager application (CMA) 214 and targeted to the MCU. Exemplary instructions include instruction to set a connection with certain endpoints. The instruction can be placed in the queue associated with MCUC 215 by the relevant CMA 214. The MCUC 215 sends the command to the relevant MCU, waits for receiving status information on the success of setting the one or more connections with the endpoints, and sends the status information to the CMA 214.

The database (DB) 222 can include several sections, including a system section (SSDB), a site DB, and active sessions DB (ASDB). The SSDB may include information on different type of communication devices such as different terminals IP-Phones, multimedia endpoints, controllers (MCU, PBX, IP-PBX), scheduling system, management system, etc. The SSDB can be prepared by the vendor of CMS 200 and can be sorted according to device type. The site DB may include information relevant to a current site (the organizational premises in which the CMS is installed) including user names, addresses (dial-in numbers, IP address, User's address book, etc.), type of endpoints, topology, etc. The site DB can be sorted according to user's name, controller ID number, etc. In addition it can include MMEP mapping table as well as indexing tables that delivers for each ID of MMEP 112 (FIG. 1*a*) or a personal communication device 132 (FIG. 1*a*) its communication parameters. Such parameters include type, module, dial in number or IP address, type of protocols, etc. This section can be adapted and configured during the installation of the system and can be updated from time to time by an administrator of the organization. The ASDB is a section in the DB in which each of the different modules of the CMS (multimedia, interfacing applications or business logic applications) store information used for their operation and store results of their operation to share with other modules. This section can be organized according to active sessions.

SM 224 can be implemented by a random access memory (RAM) that is used for interfacing between the different modules that are currently active. SM 224 may contain a bank of queues. Each queue can be associated with a current active module of the CMS. From such a queue each active module can retrieve information or a pointer to the next information or instruction that the module will need during its next process. The information itself can reside in the DB 222. This pointer and/or the information are placed in the queue by another active module that used or created this information. In some exemplary embodiments SM 224 can be embedded as a logical part in DB.

DME 226 may include a bank of algorithms that can be used by dispatcher 228, PASIF 297 or CMA 214 when a decision is needed. For example DME 226 may be requested to determine if a room has two MMEP which MMEP can be selected as nearby MMEP. The decision can be based on user experience, occupation of the MMEP, reservation of a certain MMEP, etc. In addition DME 228 can be used for determining if a user of PASR 166 that sent the nearby message is eligible to upgrade his session into multimedia session using the nearby MMEP, etc.

CM 293 is in charge on the communication between the CMS 200 and other equipment. For implementing data communication over a network using the Open System Interconnection (OSI) reference model, CM 293 is adapted to handle the first four layers: the physical layer 1, link layer 2, network layer 3, and the transport layer 4 (the TCP stack). In addition CM 293 may include a H.323 Gatekeeper Stack for working in H.323 protocol, and/or SIP stack for working in SIP protocol and/or HTTP server for working also as a web-server. In another embodiment CM 293 may include a communication module for communicating over ISDN, regular phones etc.

After installation of the system, the MCS 200 and PAS 160 (FIG. 1*a*) can be configured to operate in the particular organization. The solution specific set of components (SSSC) 230 provides functional modules that are specifically needed to solve the requests/needs of the organization in which the CMS 200 is installed and for adapting the operation of CMS 200 to the needs of the systems that are installed in the organization premises. Exemplary SSSC 230 may include one or more application program interfaces (API) 236, 237 & 238, business logic modules such as reservation module 233, policy module 234 and impromptu conference module 235 and administrator tools. Exemplary administrator's tools can include a graphical human interface (GUI) 231 to be used by an administrator of the organization and PAST power mapping application (PPMA) 232.

An API may be needed for each of the systems that are installed in the organizational premises 100 (FIG. 1*a*). For example if the multimedia system 110 (FIG. 1) includes two or more types of MCUs 114, an API 237 for each type of MCU is needed. An API 238 is needed for each type of PBX 124 and/or each type of IP-PBX 134 that are installed in premises 100. Furthermore an API 236 may be needed for interfacing with a scheduling server 142 and EDB 144.

Exemplary business logic modules are adapted to the requirement of the organization and its one or more policies if such exist. For example, reservation module 233 may include a set of rules defining employees' rights for scheduling a multimedia session. Policy module 234 can include security limitation for preventing access to multimedia conferences, maximum length of a multimedia session, type of layouts, policy for selecting one or more speakers in a conference, maximum number of conferees in a conference, etc. Impromptu conference module can include information regarding who is entitle to start an impromptu session over which MMEP, in which hours, etc.

Administrator's GUI 231 can also be adapted to the requirements of the organization and may include the logo of the organization, the same icons used in the organization site, same maintenance page-format that is used by the administrator of the network, etc. The GUI may include forms for associating the plurality PAST 163 (FIG. 1*a*) with MMEP 122 (FIG. 1a) or with rooms as well as forms for associating PASR 166 (FIG. 1a) with personal communication devices 112 (FIG. 1a).

PAST power mapping application (PPMA) 232 can be capable of generating a mapping table in which each entry is associated with a room or a MMEP. Each entry can be defined by a combination of received power that is observed with several PASR 166 (FIG. 1a) at a certain room, for example. After initiating the mapping application 232 an administrator is requested to get one or more personal communication devices 132 with its associated PASR 166 and to visit the rooms that have one or more MMEPs 112. At each room the administrator can walk around while the PASRs 166 that are involved in the mapping process send their nearby messages to PASIF 297 which process the message and transfer the ID number of the PAST with their received power to PPMA 232.

Per each room PPMA 232 can calculate an average power of a signal received from each PAST 163. The average power can be the average of the plurality of PASR 166 and messages that were received from plurality of locations in the room. Then per each room a list is prepared; each entry in the list includes the ID number of a PAST (or associated MMEP or associated room) and the average power of its signal. The list can be sorted according to the average power and the combination of the sorted ID number can define the room. After measuring all the rooms, PPMA 232 can create a mapping table in which each entry can be associated with a room, for example, and each entry include the combination that was calculated during the measuring step. Each entry may include one or more MMEP 112 that can be used as a nearby MMEP when a user enters this room. During day to day operation as PPMA idles it may be initiated from time to time by the administrator. Other embodiments may use other mapping methods for PAS 160 to the organization premises 100.

Each of the plurality of session contexts 2210 is associated with a communication session currently conducted by CMS 200. Although three session contexts 2210 are illustrated, the presented configuration is intended to be illustrative only; any number of session contexts could exist. An exemplary context can be initiated when a nearby message from a new PASR 166 is received. The session can be initiated by DM 228 and may include a IPPAM 2213 assigned to a personal communication device associated with the PASR 166 that sent the nearby message, an EPCD 2211a assigned to the nearby MMEP mentioned in the nearby message, and a context manager CMA 2214. During the session the user of the personal communication device can upgrade the session to a multimedia conference with six participants, for example. Upgrading the session and adding participants can be implemented using the generic control panels loaded to the control panel of the personal communication device via IPPAM 2213.

Out of these six conferees, two conferees have endpoints type 'A' and four conferees have endpoints type 'B', as illustrated by two endpoint type 'A' EPCDa 2211A and four endpoint type 'B' EPCDb 2211B. To control the MCU 114 (FIG. 1a) of the organization (an MGC 50 in this example) context 2210 includes an MCUC 2215 that is adapted to control an MGC 50. CMA 2214 manages the activity of the context. CMA 2214 controls the relevant endpoints via EPCDa 2211A or EPCDb 2211B, the MGC 50 via MCUC 2215 and API 237, and the PBX via API 238. More information on the operating of an exemplary CMS is described below in conjunction with FIGS. 3 and 4. Exemplary middleware is described in U.S. patent application Ser. No. 11/278,847, the entire contents of which are incorporated herein by reference.

Figure 2B:
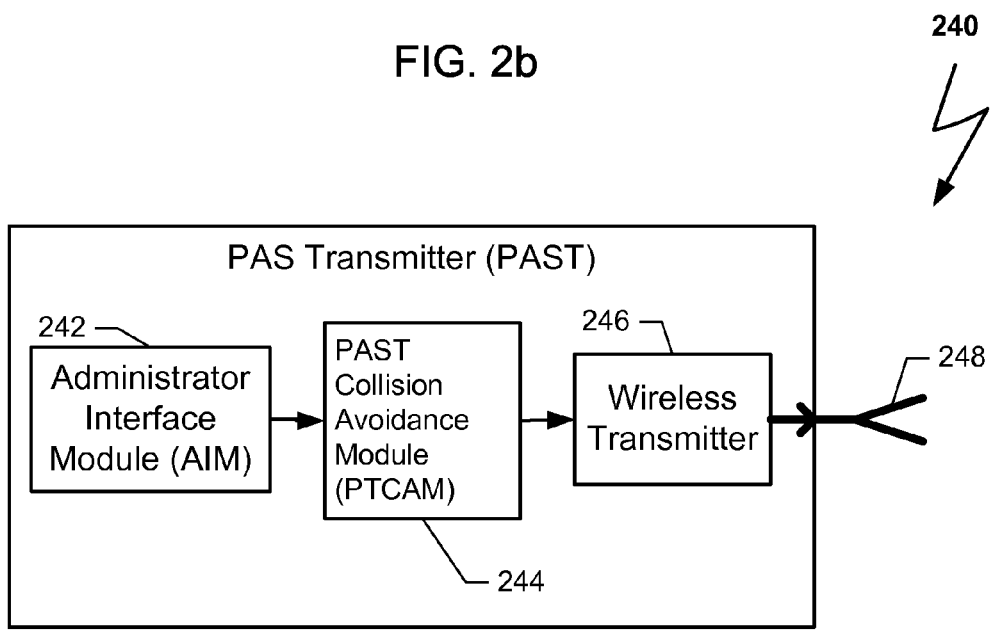
FIG. 2b is a simplified block diagram of an exemplary PAS transmitter (PAST)

FIG. 2b is a block diagram of an exemplary PAST 240. FIG. 2b illustrates relevant elements of PAST 240. An exemplary PAST can include an administrator interface module (AIM) 242, a PAST collision avoidance module (PTCAM) 244, a wireless transmitter 246 and an antenna 248. An exemplary PAST 240 can be associated with a MMEP, such as MMEP 112 (FIG. 1a). Alternatively PAST 240 can be embedded within a MMEP 112. In other exemplary configurations PAST 240 can be associated with a room. In such embodiment PASIF 297 (FIG. 2a) may use an index table in which each entry is associated with a room ID and contains information about one or more MMEP 112 which are associated with the room. The index table can be prepared by an administrator of network 100 (FIG. 1), using GUI 231 (FIG. 2a), during installation of PAS 160 (FIG. 1). Yet in an alternate configuration of PAS 160, an exemplary PAST 240 can be associated with a personal communication device such as IPP 132 (FIG. 1a); alternatively it can be embedded within a personal communication device. In other exemplary configurations PAST 240 can be associated with a user, using an employee RFID card, for example. In such embodiment PASIF 297 (FIG. 2a) may use an index table in which each entry is associated with a user ID and contains information about his personal communication device.

Administrator interface module 242 is used by the administrator of system 100 (FIG. 1a) for associating a PAST 240 with an MMEP or a personal communication device or a user according to the implementation of PAS 160. An exemplary AIM 242 can be a set of switches by which the administrator defines the ID number of the PAST 240. In alternate embodiment of PAST 240 AIM 242 can be a preloaded flash memory loaded with an ID number of PAST 240. Yet in another embodiment of PAST 240 the ID number can be loaded via the administrator's computer. After loading the ID number to PAST 240 the administrator using GUI 231 adds an entry to the index table in which the association of the PAST ID and according to the implementation of PAS 160 a user or a personal communication device or MMEP is stored. The index table can be stored in DB 222 (FIG. 2a). The PAST ID number stored in AIM 242 is used by PTCAM 244. In an alternate exemplary embodiment AIM 242 can be a network connection for remotely configuration PAST collision avoidance module, PTCAM 244, is used for preventing collision of information received from different PAST by the same PASR. Several collision avoidance methods can be implemented by different embodiments of PAS 160 (FIG. 1). An exemplary PAS 160 can use frequency sharing method in which each PAST 240 transmit in a unique frequency. The frequency reflects the ID number associated with the PAST and stored by AIM 242. In such embodiment PTCAM can be a synthesizer that generates a RF signal in a frequency that matches the stored ID value of PAST 240. A plurality of collision avoidance methods can be implemented by different embodiments of the present invention. Some embodiments may use time division methods (TDM), others may use snooping methods. In other embodiments the collision avoidance methods may comply with common wireless protocols for short range communication or proximity. Exemplary short range protocols can be Bluetooth, WiFI, etc.

Wireless transmitter 246 can be an RF transmitter using an RF antenna 248 using a single carrier or a plurality of carrier wherein each carrier is associated with the PAST ID number. Alternatively, PAS 160 wireless transmitter 246 can be infrared transmitter using a lens as antenna 248. The modulation can be amplitude modulation (AM), frequency modulation (FM), phase modulation (PM), or any other type of modulation.

Other exemplary embodiments can use common wireless protocols for short range communication or proximity. Exemplary short range protocols can be Bluetooth, WiFI, etc.

Figure 2C:
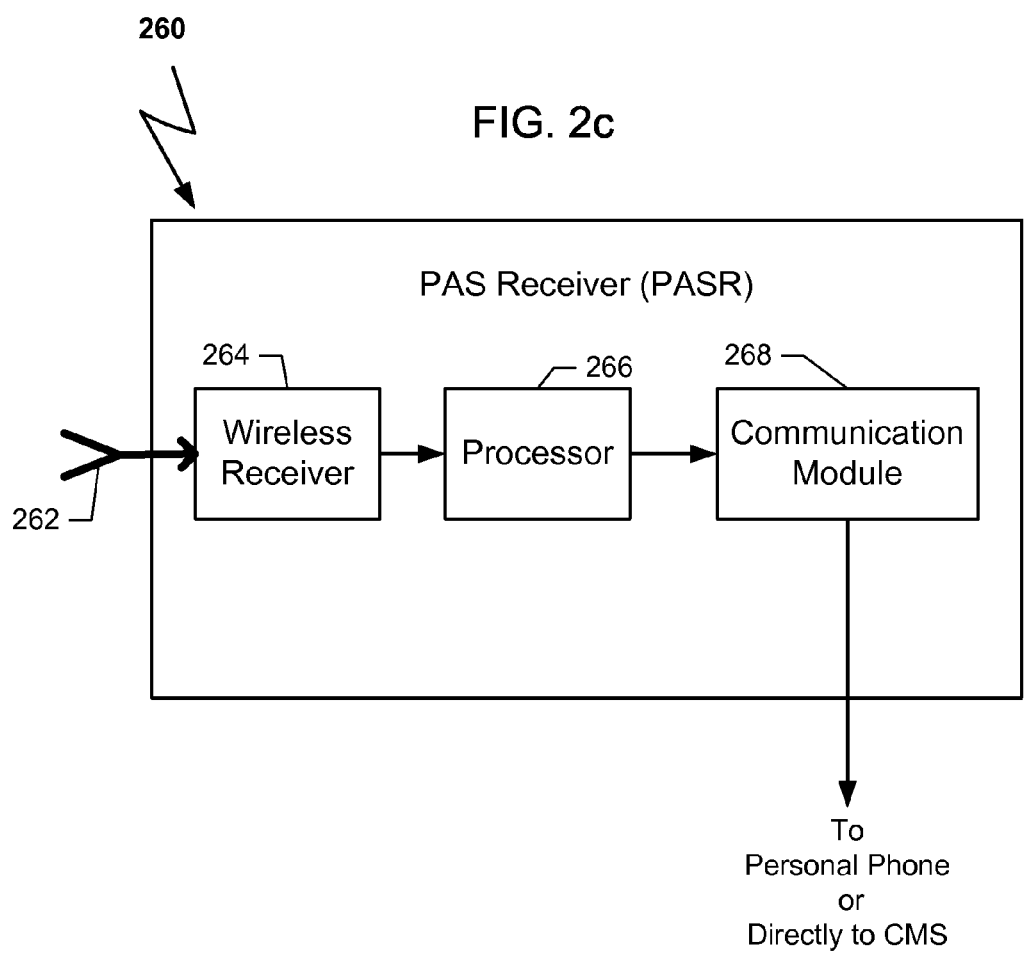
FIG. 2c is a simplified block diagram of an exemplary PAS receiver (PASR)

FIG. 2c is a block diagram of an exemplary PASR 260. An exemplary PASR 260 can include an antenna 262, a wireless receiver 264, a processor 266, and a PASR communication module (PRCM) 268. An exemplary PASR 260 can be associated with a personal communication device, such as IPP 132 (FIG. 1a); alternatively it can be embedded within a personal communication device. In other exemplary configurations PASR 260 can be associated with a MMEP, such as MMEP 112 (FIG. 1a). Alternatively PASR 260 can be embedded within a MMEP 112. In other exemplary configurations PASR 260 can be associated with a room. In such embodiment PASIF 297 (FIG. 2a) may use an index table in which each entry is associated with a room ID and contains information about one or more MMEP 112 associated with the room. The index table can be prepared by an administrator of network 100 (FIG. 1), using GUI 231 (FIG. 2a), during installation of PAS 160 (FIG. 1).

In one exemplary embodiment wireless antenna 262 and receiver 264 are based on IR technology. Therefore the antenna can be an array of lenses while the receiver can be an IR detector. If PAS 160 (FIG. 1a) is based on RF technology receiver 264 match the collision avoidance and method and transmission technologies that is used. For example if the collision avoidance method is frequency deviation, then receiver 264 can scan the frequency band from one carrier to the other searching for a received signal. When a signal is detected the scanning holds for a certain period in which the signal is detected, the power of the received signal is measured and the detected signal with its power indication as well as the frequency of the received signal are transferred to processor 266. In some exemplary embodiments the carrier signal is not modulated with the ID number since the frequency of the received signal can reflect the ID number of the PAST that sent the signal. After transferring the information to the processor the scan can continue and the receiver can move toward another carrier if exist. At the end of the receiving frequency band the scanning start from the beginning. One scanning cycle can be referred as measuring period or monitoring period.

Other exemplary embodiments can use common wireless protocols for short range communication or proximity. Exemplary short range protocols can be Bluetooth, WiFI, etc.

An exemplary processor 266 can be adapted to receive the detected signal and its power from the receiver. The detected signal can be processed and converted into the ID number. Then the ID number and its power are transferred to the communication module 268 to be sent toward PASIF 297. Further processing of the received nearby massages is implemented by PASIF 297 (FIG. 2a) as disclosed above. In other embodiments of PASR 260 the processor 266 can be adapted determine which received ID number is the dominant and can be defined as the nearby MMEP. Processor 266 can average several consecutive received signals of the same PAST in order to determine an average power value of the PAST. The average received power of all received PASTs are compared and the one with highest power can be defined as the nearby MMEP. In such embodiment only the final decision is transferred to the communication module 268.

Communication module 268 receives the data from processor 266 and manipulates it according to a format of a nearby message that complies with the communication protocol used by CM 293 (FIG. 2a) and PASIF 297. In one embodiment the nearby message is transferred to the associated personal communication device and from there is sent toward CM 293. In another exemplary embodiment communication module 268 is capable of establishing a direct connection with CM 293 on which the nearby message is transferred.

Figure 3:
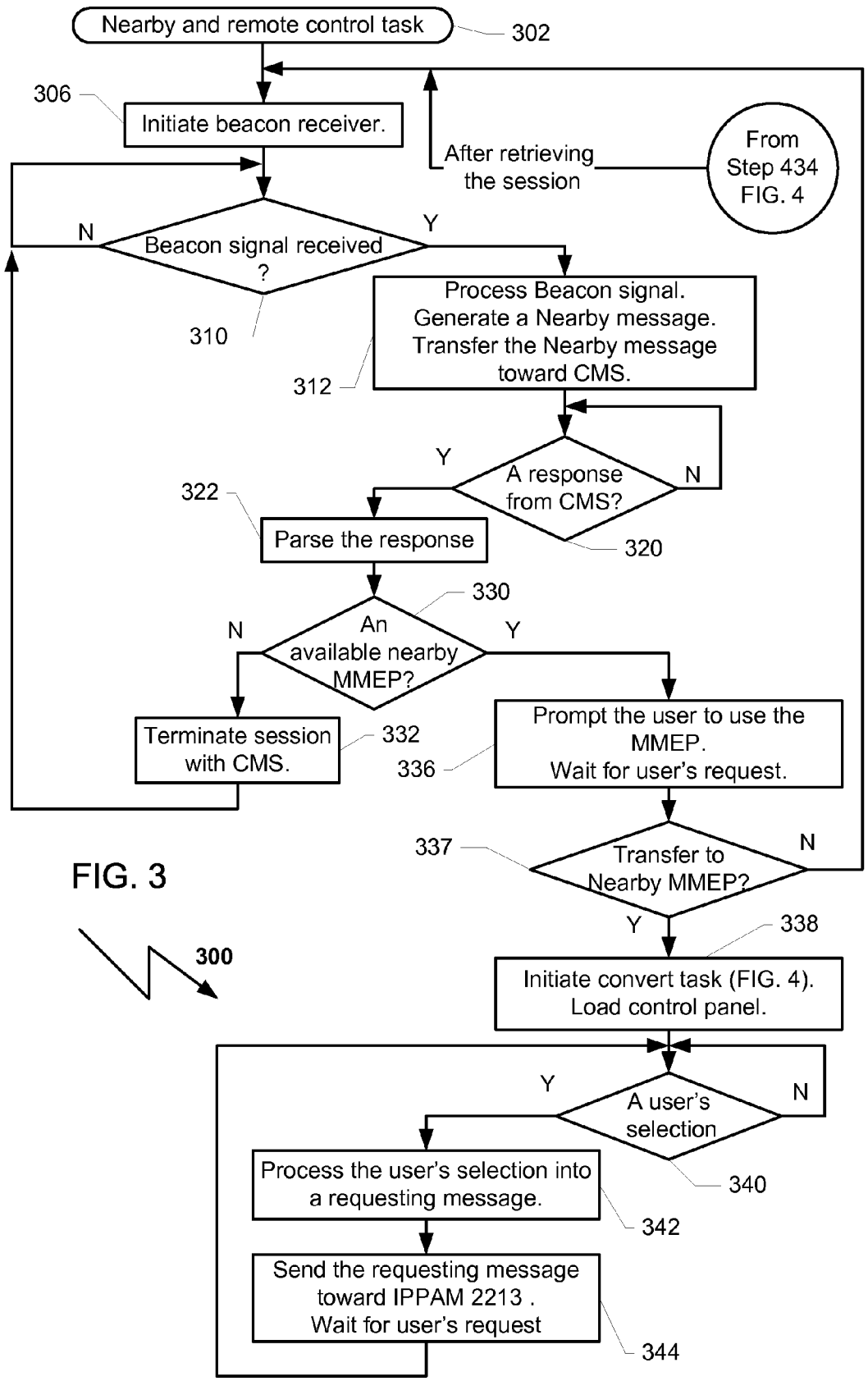
FIG. 3 is a flowchart illustrating relevant processes for handling a nearby task.

FIG. 3 illustrates relevant processes for handling a nearby and control task 300. The nearby and control task 300 can be implemented by a PASR 166 (FIG. 1a) and its associated personal communication device 132 (FIG. 1a). Steps 302 to 312 can be executed by a PASR 166; steps 320 to 332 or 344 can be executed by the associated personal communication device 132. The task can be initiated 302 upon power-on of PASR 166. During its initiation 306 PASR 166 can introduce itself to its associated IPP 132 and CMS 150 and it can be updated with new data that is related to the communication system 100 (FIG. 1a). After the initiation process, method 300 can start a beacon receiving process 310. The beacon receiving process 310 depends on the protocol used by PAS 160 (FIG. 1).

Per each received signal the decoded data and its power information are written in a list. At the end of the measuring period method 300 proceed to stage 312.

At step 312 the data and power of each received beacon signal is processed. At the end of the process a list of PAST's ID numbers with their power is created. PAST's ID number can reflect its associated MMEP or room, for example. In one exemplary process 312 the list of couples: ID number and its power, is processed into a nearby message according to the communication protocol use by PASR 166 and CMS 150 and sent toward PASIF 297 (FIG. 2a). Further processing of the received nearby massages is implemented by PASIF 297 (FIG. 2a) as disclosed above. In other embodiments process 312 can be adapted to determine which received ID number is the dominant. The MMEP associated with the dominant PAST can be defined as the nearby MMEP. Exemplary process 312 can average several consecutive received signals of the same PAST in order to determine an average power value of each PAST 163. Then, the average received powers of all received PASTs are compared and the one with highest average power can define the nearby MMEP. In such embodiment only the dominant ID number is converted into a nearby message and is transferred toward PASIF 297 (FIG. 2a).

Another exemplary nearby task (not shown in the drawing) may use a modified method 300. PASR 166 may run in a loop between modified steps 310 and 312, independently on the ongoing activity of the reset of the modified process 300. In such exemplary embodiment, after sending the nearby message, modified method 300 can wait for a certain period, a measuring period, and may return to step 310 starting a new measuring cycle. The measuring period can be a configurable time period. In some embodiments the measuring period depends on protocol used by PAS 160. The followed nearby messages can be processed by CMS 150 for determining a change in the location of the user and controlling the communication session according to the new location of the relevant PASR 166.

After sending 312 the nearby message, method 300 can proceed and be executed over the associated personal communication device 132 (FIG. 1a). IPP 132 can wait 320 for a response to the nearby message. The response can be sent by CMS 150. The response can be initiated by PASIF 297 (FIG. 2a) and adapted to the requirement of the personal communication device by IPPAM 2213 (FIG. 2a) that was allocated to the context 2210 (FIG. 2a) that was assigned the session and sent via CM 293 (FIG. 2a) directly or via IP-PBX 134 (FIG. 1a) to IPP 132. The personal communication device can parse 322 the response and determine whether a nearby MMEP 112 is available. If 330 no, which means that the nearby MMEP 112 is busy or in off position or reserved for another session, etc., the session with CMS 150 can be terminated 332 and an indication can be displayed to the user indicating that no MMEP is available and method 300 returns to step 310 starting, over PASR 166, a new cycle of searching a nearby MMEP. An exemplary method 300 can be adapted to return to step 310, if a response to a nearby message is not received 320 after a certain waiting period.

If 330 a nearby MMEP 112 is available, a message can be sent 336 to the personal communication device prompting the user to upgrade the session into a multimedia session over the nearby MMEP. In some embodiments a list of optional nearby MMEP can be delivered allowing the user to select one of them. Then method 300 may wait 340 for the user request. In some embodiments, process 336 can be adapted to initiate a new searching cycle (steps 310-312) for a nearby MMEP to verify the location of the user. If 337 no request is received after the waiting period method 300 can return to step 306 and initiating the beacon receiver process.

If 337 a user's request to transfer the session, which was preformed via the control panel of the personal communication device 132, is received then the convert task 400 (FIG. 4) is initiated 338, and a multimedia generic control panel is loaded 338 to the control panel of the personal communication device. In some embodiments, a loading of a generic control panel can include optional keys to be configured by the user. After loading the generic control panel, method 300 can wait 340 for receiving a user request. Upon receiving a user request 342, the request is processed according to the communication protocol used between IPP 132 and CM 293 (FIG. 2a). The processed message is transferred directly or via IP-PBX 134 to CM 293 and from there the request is transferred 344 to IPPAM 2213 to be translated into a format that can be parsed and be executed by CMA 2214 (FIG. 2a) that is assigned to the same CSC 2210. Then, method 300 returns to step 340 waiting for the next user command/request.

Figure 4:
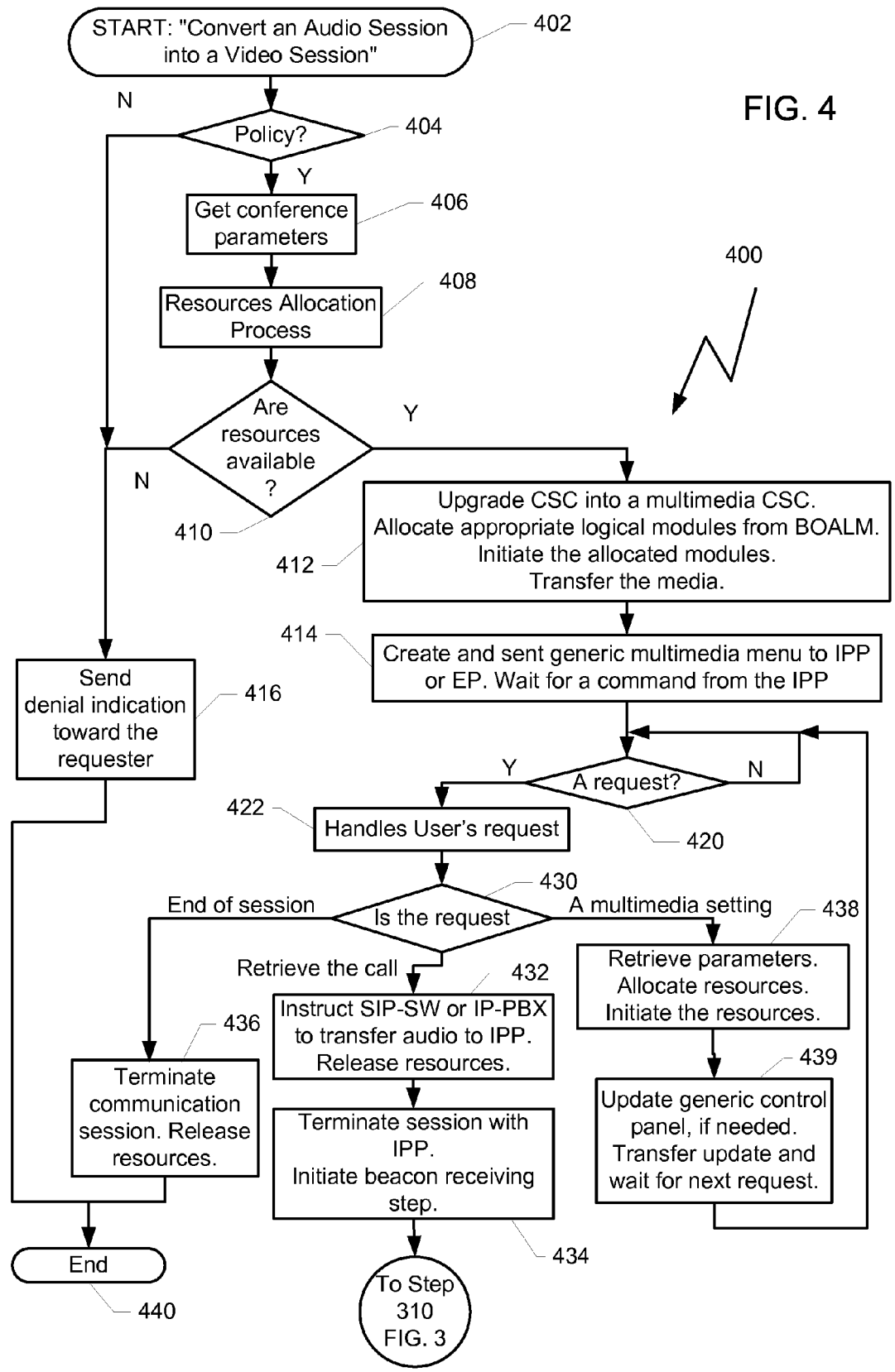
FIG. 4 is a flowchart illustrating the steps for transferring an audio session into a video session and controlling the session via a control panel of a phone.

FIG. 4 is a flowchart illustrating a process 400 for upgrading an audio session into a video session over a nearby MMEP 112 (FIG. 1a), for example. Process 400 may be initiated 402 by the users of a personal communication device 132 (FIG. 1a) and PASR 166 after be informed that a nearby MMEP 112 is available to participate in a communication session (steps 330 and 336 in FIG. 3). In one exemplary embodiment process 400 can be executed by DM 228 (FIG. 2a) that manages the resource allocation of CMS 200 (FIG. 2a). In an alternate exemplary embodiment process 400 can be executed by a CMA 2214 that was allocated to the CSC 2210 (FIG. 2a), which was assigned to the session at step 336 (FIG. 3) as result of processing the nearby message. In such embodiment CMA 2214 can be capable of allocating resources that are associated with its session.

The user by using the generic control panel requesting to convert the ongoing audio session that is currently conducted over his personal communication device 132 (FIG. 1a) into a multimedia session over the nearby MMEP 112. In the case that the audio session is audio conferencing the audio conference can be converted to a video conference between the same conferees using their MMEPs. The request can be transferred via the IP-PBX 134 (FIG. 1a) or directly to CM 293 (FIG. 2a), which processes the packet according to the communication protocols. The processed request is transferred to IPPAM 2213 that further processes the request and translates it to the format that is used over the CMS 200 (FIG. 2a).

At step 404 a decision is made whether the requester is authorized to start a multimedia session over the nearby MMEP 112 (FIG. 1a). The decision can be received from the impromptu conference module 235 (FIG. 2a) at SSSC 230 (FIG. 2a) and/or by using the policy database 234 (FIG. 2a). If the requester is authorized to start a multimedia session, then information on conferees that are currently associated with the audio session can be retrieved from IP-PBX 134 (FIG. 1a) via API 238 (FIG. 2a). Information on the MMEPs of the conferees can retrieved 406 from the site section of the DB 222. If there is no information in DB 222, the organization management system 140 (FIG. 1a) can be consulted via API 236 (FIG. 2a) for a buddy list that is associated with the requester. The buddy list can be searched for getting communication parameters that are relevant to the conferees' MMEP. Conferees for which information on their MMEP does not exist may be connected to the multimedia session as audio conferees and can be added later using manual dialing.

If 404 the requester is not authorized to start an impromptu conference, then a denial indication is sent 416 to the requester via IPPAM 2213 (FIG. 2a). The denial message can be an IVR message or visual indications on the generic control panel, in some embodiments, the denial message can be displayed over the screen of the nearby MMEP, for example. The denial message can be sent through CM 293 (FIG. 2a) directly or via API 238 (FIG. 2a) and IP-PBX 134 (FIG. 1a). Each intermediate module adapts the message according to is functionality. CM 293 processes the message according to the communication protocols over system 100 (FIG. 1a) and API 238 translates the message to the format used over the IP-PBX 134. After sending the denial indication method 400 terminates 440. Conveying the information between the internal modules of CMS 200 (FIG. 2a) can be done by placing the information in the queue that is associated to the relevant module. The queues can be part of SM 224 (FIG. 2a), for example.

Returning to step 406, after collecting information on the MMEPs 112 that is associated with the one or more participants of the session, other than the requester, a resource allocation process is initiated 408. An exemplary resource allocation process can be conducted in consideration with the MCU 114 (FIG. 1a) via its API 237 (FIG. 2a) and with DME 226. The allocation can be based on the information about the endpoints. Such information includes the type of networks that can be used (circuit switch or IP), type of compression standards, bit rates etc. DME 226 can recommend a best setup and topology for the session. The selection can be considered with the MCU 114 via its API 237. If resources are not available the allocation process may continue and DME 226 may offer another configuration, etc. This process can proceed until DME 226 may determine 410 that there is no any possible setup that can be supported by the current available resources. Then method 400 may proceed to step 416 and deny the request and be terminated 440.

If resources are available 410, the allocation process 408 can be terminated and method 400 can proceed to step 412 and the CSC 2210 (FIG. 2a) that was allocated to the session in response to the received nearby message (step 312 in FIG. 3) can be upgraded to support the required multimedia session. Appropriate logical modules from the BOALM 210 (FIG. 2a) are allocated to the CSC. The appropriate logical modules can include EPCD logical modules 211 that match the type of the relevant endpoints, (two EPCDA 2211A and four EPCDB 2211B, FIG. 2a), an MCUC logical module 2215, and CMA 2214 can be upgraded to include multimedia controlling capabilities. The logical modules can be informed about the parameters of the session, including participant ID numbers, conference ID number, relevant queues, etc. This information can be used during retrieving the appropriate data from DB 222 and SM 224 (FIG. 2a). The logical modules of the upgraded context can be initiated and CMA 2214 may start a process for establishing the multimedia, multipoint session. For example, a list of dial-out numbers of endpoints, to which the allocated MCU has to dial, is sent to the MCU via MCUC 2215 and API 237 (FIG. 2*a*) of the MCU. In parallel, each of the MMEP that can dial-in to the MCU, can get a dial-in number via the appropriate EPCDA 2211A or EPCDB 2211B. In addition a list of conferees, who will continue the session as audio conferees, can be transferred to IP-PBX 134 (FIG. 1*a*) via API 238 (FIG. 2*a*) or SIP-SW (not shown in the drawings) with a request to transfer their media via the MCU 114.

A generic multimedia control panel can be created 414 and sent to the control panel of the personal communication device IPP 132 (FIG. 1*a*) via IPPAM 2213 and CM 293 (FIG. 2*a*) and method 400 can wait 420 to receive a request from the user via the generic control panel. In some embodiments, a loading of a generic multimedia control panel can include optional keys to be configured by the user.

A user's request from the generic control panel of the personal communication device 132 is transferred directly or via IP-PBX 134 to CM 293 and from there to IPPAM 2213 to be translated into a format that can be parsed 422 by CMA 2214 (FIG. 2*a*) that is assigned to the same CSC 2210. If 430 the request is for a multimedia setting such as to add conferee or change layout, etc., parameters of the change are retrieved 438 from the request and accordingly resources are allocated to support the needs of the user. For example if the request is to add to the session a new conferee having a MMEP, then an appropriate EPCD 211, which matches the new conferee's MMEP, can be allocated to the context. Dialing information and other communication parameters, such as bandwidth, which are associated with the new MMEP can be loaded to the allocated EPCD. In addition an MCUC 2215 can instruct the MCU 114 (FIG. 1*a*) to add resources for handling the additional conferee. After loading the parameters, the allocated resources can be initiated for executing the user's request.

At step 439 CMA 2214 can determine if a new generic control panel has to be loaded to the personal communication device 132. The new control panel, if needed, can be adapted to match the new setup. If a new control panel is needed, the appropriate generic control panel can be transferred to IPPAM 2213 to be translated into a format that complies with the needs of the IPP 132. The translated control panel is transferred to the personal communication device and method 400 returns to step 420 waiting for the next user's request. If a new control panel is not needed, then method 400 returns to step 420.

If 430 the request is for retrieving the session back to the personal communication device 132, then CMA 2214 can request 432 the IP-PBX 134 or a SIP-SW (not shown) to transfer the audio of the session back to the personal communication device. The request can be sent via the appropriate API, such as API of IP-PBX 238 (FIG. 2*a*). The session between the IPP-Phone and CMA 2214 can be terminated and allocated resources can be released. Releasing the resources can depend on the continuation of the multimedia session. In the case that the multimedia session continues although the requester continues the session on his phone, then the resources of CSC 2210 (FIG. 2*a*) and MCU 114 (FIG. 1*a*) may remain. In the case that the entire multimedia session is terminated then the resources of the relevant CSC 2210 can be released as well as the resources of the MCU and the relevant endpoints. Furthermore, instructions to set the relevant PASR can be sent 434 to the relevant PASR and method 400 can return to step 310 in FIG. 3 waiting for the next beacon signal.

If 430 the request is for terminating the communication session, then the resources that were allocated to the communication session in the relevant CSC 2210 as well as resources in the MCU 114 and/or IP-PBX 134, MMEP 112, bandwidth resources, etc. can be released 436 and method 400 ended 440.

In the present disclosure, the words "unit," "element," "module" and "logical module" can be used interchangeably. Anything designated as a unit or module can be a stand-alone unit or a specialized or integrated module. A unit or a module can be modular or have modular aspects allowing it to be easily removed and replaced with another similar unit or module. Each unit or module may be any one of, or any combination of, software, hardware, and/or firmware. Software of a logical module can be embodied on a computer readable medium such as a read/write hard disc, CDROM, Flash memory, ROM, etc. In order to execute a certain task a software program can be loaded to an appropriate processor as needed.

In the description and claims of the present disclosure, "comprise," "include," "have," and conjugates thereof are used to indicate that the object or objects of the verb are not necessarily a complete listing of members, components, elements, or parts of the subject or subjects of the verb.

It will be appreciated that the above described apparatus, systems and methods can be varied in many ways, including, changing the order of steps, and the exact implementation used. The described embodiments include different features, not all of which are required in all embodiments of the present disclosure. Moreover, some embodiments of the present disclosure use only some of the features or possible combinations of the features. Different combinations of features noted in the described embodiments will occur to a person skilled in the art. Furthermore, some embodiments of the present disclosure can be implemented by combination of features and elements that have been described in association to different exemplary embodiments along the disclosure. The scope of the invention is limited only by the following claims.

I claim:

1. A conferencing management apparatus for managing conferencing resources in a premises, comprising:
 a communications link for communicating with a proximity announcing system; and
 a processor programmed to:
  receive data from the proximity announcing system indicating that a portable communication device is in a proximity of a conferencing device; and
  in response to the data from the proximity announcing system, transmit data causing a user interface of the portable communication device to indicate the proximity of the conferencing device.

2. The apparatus of claim 1, wherein the portable communication device is selected from the group consisting of an IP-phone, a portable computer, a smart phone, and a personal digital assistant.

3. The apparatus of claim 1, wherein the data from the proximity announcing system indicates a room within the premises where the portable communication device is located.

4. The apparatus of claim 3, wherein the processor is programmed to identify a conferencing device in the room.

5. The apparatus of claim 1, wherein the processor is further programmed to determine an availability of the conferencing device.

6. The apparatus of claim 1, wherein the processor is further programmed to detect that the portable communication device is engaged in a communication session and to send a prompt to the portable communication device prompting for a request to transfer the communication session from the portable communication device to the local conferencing device.

7. A proximity announcing system for determining a proximity of a portable communication device to a conferencing device, comprising:
- a wireless transmitter associated with either a conferencing device or a portable communication device;
- a wireless receiver associated with the other of the conferencing device or the portable communication device;
- a processor communicatively coupled to the wireless receiver programmed to:
  - receive data representative of a signal the wireless receiver receives from the wireless transmitter, wherein the data indicates a room where the wireless transmitter is located, and
  - from the data determine a proximity of the portable communication device to the conferencing device by determining that either the conferencing device or the portable communication device is associated with the room.

8. The system of claim 7, wherein the transmitter is associated with the conferencing device and the data identifies the conferencing device.

9. The system of claim 7, wherein the data represents a strength of the signal the wireless receiver receives from the wireless transmitter.

10. A conferencing management apparatus for managing conferencing resources in a premises, comprising:
- a network interface for connecting to one or more portable communication devices in the premises and to one or more conferencing devices the premises; and
- a processor programmed to:
  - receive data indicating that a portable communication device is engaged in a communication session in a proximity of a conferencing device;
  - transmit data to the portable communication device causing the portable communication device to announce an option to transfer the communication session to the conferencing device; and
  - in response to a request to transfer the communication session, sending data to the conferencing device via the network interface causing the conferencing device to initiate a conferencing session with a multimedia endpoint.

11. The apparatus of claim 10, wherein the data indicating that a portable communication device is engaged in a communication session in a proximity of a conferencing device comprises data characteristic of a beacon transmitted by a transmitter associated with at least one of the one or more conferencing devices and received by the portable communication device.

12. The apparatus of claim 11, wherein the data indicating that a portable communication device is engaged in a communication session in a proximity of a conferencing device comprises data characteristic of a strength of the beacon received by the portable communication device and wherein the processor is further programmed to determine the location of the portable communication device by matching the beacon strength with values stored in the database relating beacon strength with location.

13. The apparatus of claim 10, wherein the portable communication device is selected from the group consisting of an IP-phone, a portable computer, a smart phone, and a personal digital assistant.

14. The apparatus of claim 10, further comprising a communications link to a scheduling server.

15. The apparatus of claim 14, wherein the processor is further programmed to query the scheduling server for an availability of the conferencing device before transmitting data to the portable communication device causing the portable communication device to announce an option to transfer the communication session to the conferencing device.

16. The apparatus of claim 10, further comprising a communications link to an employ data base.

17. The apparatus of claim 16, wherein the processor is further programmed to query the employee database to determine contact information for the remote endpoint.

18. The apparatus of claim 10, wherein causing the conferencing device to initiate a conferencing session with a remote endpoint comprises instructing a multipoint control unit to initiate a connection between the multipoint control unit and the remote endpoint.

19. A method of managing communication sessions and conferencing sessions in a premises, comprising:
- receiving data at a communications management server indicating that a portable communication device in the premises is engaged in a communication session;
- identifying one or more conferencing devices in a proximity of the portable communication device;
- transmitting data to the portable communication device causing the portable communication device to announce an option to transfer the communication session to the conferencing device; and
- in response to a request to transfer the communication session, sending data to the conferencing device causing the conferencing device to initiate a conferencing session with a multimedia endpoint.

20. The method of claim 19, wherein identifying one or more conferencing devices comprises determining a location of the portable communication device and querying a data base to identify one or more conferencing devices in a proximity to the location of the portable communication device.

21. The method of claim 19, further comprising querying a scheduling server to determine an availability of the conferencing device.

22. The method of claim 19, further comprising identifying a remote portable communication device engaged in a communication session with the portable communication device and querying a data base to identify contact information for a remote endpoint associated with the remote portable communication device.

* * * * *